(12) United States Patent
Coon

(10) Patent No.: US 12,209,361 B2
(45) Date of Patent: Jan. 28, 2025

(54) CARPETS HAVING AN IMPROVED DELAMINATION STRENGTH AND FLUID BARRIER PROPERTIES AND METHODS OF MAKING SAME

(71) Applicant: Columbia Insurance Company, Omaha, NE (US)

(72) Inventor: Jeffrey Thomas Coon, Dalton, GA (US)

(73) Assignee: Columbia Insurance Company, Omaha, NE (US)

( * ) Notice: Subject to any disclaimer, the term of this patent is extended or adjusted under 35 U.S.C. 154(b) by 0 days.

(21) Appl. No.: 17/744,832

(22) Filed: May 16, 2022

(65) Prior Publication Data

US 2022/0349120 A1    Nov. 3, 2022

Related U.S. Application Data

(63) Continuation of application No. 15/862,121, filed on Jan. 4, 2018, now Pat. No. 11,346,047.

(Continued)

(51) Int. Cl.
*D06N 7/00* (2006.01)
*A47G 27/02* (2006.01)
(Continued)

(52) U.S. Cl.
CPC ........... *D06N 7/0076* (2013.01); *A47G 27/02* (2013.01); *B32B 5/06* (2013.01); *B32B 5/26* (2013.01); *B32B 37/02* (2013.01); *B32B 37/06* (2013.01); *D06N 7/0071* (2013.01); *D06N 7/0073* (2013.01); *D06N 7/0081* (2013.01); *B32B 2255/02* (2013.01); *B32B 2255/26* (2013.01); *B32B 2307/7265* (2013.01); (Continued)

(58) Field of Classification Search
CPC .. D06N 7/0071; D06N 7/0073; D06N 7/0076; D06N 7/0081; D06N 2203/041; D06N 2203/042; D06N 2203/047; D06N 2205/02; D06N 2205/023; D06N 2205/10; D06N 2205/106; D06N 2205/18; D06N 2209/10; D06N 2209/12; D06N 2209/125; D06N 2209/128; D06N 2211/066; Y10T 428/23979; Y10T 428/23993; D10B 2503/04
See application file for complete search history.

(56) References Cited

U.S. PATENT DOCUMENTS

| | | |
|---|---|---|
| 3,537,946 A | 11/1970 | Montagnino |
| 3,645,992 A | 2/1972 | Elston |

(Continued)

FOREIGN PATENT DOCUMENTS

| | | |
|---|---|---|
| CN | 1142240 | 2/1997 |
| CN | 101384345 | 3/2009 |

(Continued)

OTHER PUBLICATIONS

Blackley, D.C., Sec. 19.4.2: Methods of Applying Latex Compounds to Carpet Backs. Polymer Latices: Science and Technology. 2nd Ed., vol. 3: Applications of Latices. p. 361 (1997) (3 pages).

(Continued)

*Primary Examiner* — Cheryl Juska
(74) *Attorney, Agent, or Firm* — Ballard Spahr LLP

(57) ABSTRACT

A moisture resistant carpet exhibiting exceptional delamination strength and methods of making same are disclosed.

20 Claims, 6 Drawing Sheets

Related U.S. Application Data

(60) Provisional application No. 62/457,475, filed on Feb. 10, 2017, provisional application No. 62/442,192, filed on Jan. 4, 2017.

(51) Int. Cl.
  *B32B 5/06* (2006.01)
  *B32B 5/26* (2006.01)
  *B32B 37/02* (2006.01)
  *B32B 37/06* (2006.01)

(52) U.S. Cl.
  CPC ....... *B32B 2307/73* (2013.01); *B32B 2471/02* (2013.01); *D06N 2203/041* (2013.01); *D06N 2203/042* (2013.01); *D06N 2205/023* (2013.01); *D06N 2209/125* (2013.01); *D06N 2209/128* (2013.01); *D06N 2211/066* (2013.01); *D10B 2503/04* (2013.01); *Y10T 428/23979* (2015.04)

(56) References Cited

U.S. PATENT DOCUMENTS

| | | |
|---|---|---|
| 3,873,643 A | 3/1975 | Wu et al. |
| 3,882,194 A | 5/1975 | Krebaum et al. |
| 4,076,698 A | 2/1978 | Anderson et al. |
| 4,230,830 A | 10/1980 | Tanny et al. |
| 4,437,918 A | 3/1984 | Morohashi et al. |
| 4,503,191 A | 3/1985 | Stakelbeck |
| 4,762,890 A | 8/1988 | Strait et al. |
| 4,798,081 A | 1/1989 | Hazlitt et al. |
| 4,927,888 A | 5/1990 | Strait et al. |
| 5,008,204 A | 4/1991 | Stehling |
| 5,026,798 A | 6/1991 | Canich |
| 5,055,438 A | 10/1991 | Canich |
| 5,064,802 A | 11/1991 | Stevens et al. |
| 5,272,236 A | 12/1993 | Lai et al. |
| 5,278,272 A | 1/1994 | Lai et al. |
| 5,292,845 A | 3/1994 | Kawasaki et al. |
| 5,348,785 A | 9/1994 | Vinod |
| 5,558,916 A | 9/1996 | Heim et al. |
| 5,612,113 A | 3/1997 | Irwin, Sr. |
| 5,677,383 A | 10/1997 | Chum et al. |
| 5,714,224 A | 2/1998 | Gerry |
| 5,800,898 A | 9/1998 | Gerry |
| 5,874,148 A | 2/1999 | Hough et al. |
| 6,060,145 A | 5/2000 | Smith |
| 6,344,254 B1 | 2/2002 | Smith |
| 6,503,595 B1 | 1/2003 | Kim et al. |
| 6,572,965 B1 | 6/2003 | McGee et al. |
| 6,743,844 B1 | 6/2004 | Tabor et al. |
| 6,864,312 B2 | 3/2005 | Moore |
| 7,129,292 B1 | 10/2006 | Kristen et al. |
| 7,247,352 B2 | 7/2007 | Jones, Jr. |
| 7,431,975 B2 | 10/2008 | Zafiroglu |
| 7,459,195 B2 | 12/2008 | Holeschovsky et al. |
| 7,566,760 B2 | 7/2009 | Chowdhry et al. |
| 7,683,145 B2 | 3/2010 | Chowdhry et al. |
| 8,043,713 B2 | 10/2011 | Wevers et al. |
| 8,496,769 B2 | 7/2013 | Brumbelow et al. |
| 8,586,145 B2 | 11/2013 | Mull et al. |
| 8,617,686 B2 | 12/2013 | Pepper et al. |
| 9,885,149 B2 | 2/2018 | Weeks et al. |
| 2001/0046581 A1 | 11/2001 | Brumbelow et al. |
| 2002/0134486 A1 | 9/2002 | Brumbelow et al. |
| 2003/0211280 A1 | 11/2003 | Brumbelow et al. |
| 2004/0071927 A1 | 4/2004 | Murphy et al. |
| 2004/0202817 A1 | 10/2004 | Brumbelow et al. |
| 2005/0112320 A1 | 5/2005 | Wright |
| 2005/0260380 A1 | 5/2005 | Moon |
| 2006/0270295 A1 | 11/2006 | Fowler |
| 2009/0184037 A1 | 7/2009 | Peters et al. |
| 2009/0256103 A1 | 10/2009 | Saif et al. |
| 2010/0204352 A1 | 8/2010 | Bergman et al. |
| 2010/0272946 A1 | 10/2010 | Pepper et al. |
| 2010/0310858 A1 | 12/2010 | Wevers et al. |
| 2010/0330288 A1 | 12/2010 | Segars |
| 2011/0008567 A1 | 1/2011 | Weeks et al. |
| 2015/0299947 A1 | 10/2015 | Brumbelow et al. |
| 2016/0177077 A1 | 6/2016 | Nelliappan |
| 2017/0145630 A1 | 5/2017 | Batenburg et al. |
| 2017/0151761 A1 | 6/2017 | Segars |
| 2017/0166770 A1 | 6/2017 | Hall et al. |
| 2017/0166771 A1 | 6/2017 | Hall et al. |
| 2017/0205327 A1 | 7/2017 | Yarbrough et al. |
| 2017/0253759 A1 | 9/2017 | Kunstle et al. |
| 2018/0289191 A1 | 10/2018 | Cochran et al. |
| 2019/0352845 A1 | 11/2019 | Coon |

FOREIGN PATENT DOCUMENTS

| | | |
|---|---|---|
| CN | 101558127 | 10/2009 |
| CN | 103572604 A | 2/2014 |
| CN | 105216408 | 1/2016 |
| EP | 0416815 A | 3/1991 |
| GB | 2116114 | 9/1983 |
| JP | 5775075 B2 | 9/2015 |
| WO | WO 1995/033007 | 12/1995 |
| WO | WO-1997/036942 A1 | 10/1997 |
| WO | WO-1998/038374 A2 | 9/1998 |
| WO | WO-2002/064638 A2 | 8/2002 |
| WO | WO 2008/073724 | 6/2008 |
| WO | WO 2008/141004 | 11/2008 |
| WO | WO-2014/011450 A1 | 1/2014 |
| WO | WO-2017/004494 | 1/2017 |

OTHER PUBLICATIONS

Cady, L. D., The Role of Comonomer Type and Distribution in LLDPE Product Performance. SPE Regional Technical Conference, Quaker Square Hilton, Akron, Ohio, Oct. 1-2, pp. 107-119 (1985).

Diehl, C.F. et al., Waterborne Mechanical Dispersions of Polyolefins. The Dow Chemical Co. (2006) (14 pages).

Randall, J.C., A Review of High Resolution Liquid [13] Carbon Nuclear Magnetic Resonance Characterizations of Ethylene-Based Polymers. Rev Macromol Chem Phys. 1989; C29 (2&3):201-317.

Wild, L. et al., Determination of Branching Distributions in Polyethylene and Ethylene Copolymers. J PolySci: Poly Phys. Ed. 1982; 20:441-55.

International Search Report and Written Opinion were mailed on Mar. 26, 2018 by the International Searching Authority for Application No. PCT/US2018/012345, which was filed on Jan. 4, 2018, (Applicant-Shaw Industries Group, Inc.) (8 pages).

CARPETS HAVING AN IMPROVED DELAMINATION STRENGTH AND FLUID BARRIER PROPERTIES AND METHODS OF MAKING SAME

CROSS REFERENCE TO RELATED APPLICATIONS

This application is a continuation of U.S. patent application Ser. No. 15/862,121, filed Jan. 4, 2018, which claims the benefit of priority to U.S. provisional patent application 62/442,192, filed Jan. 4, 2017 and to U.S. provisional patent application 62/457,475, filed Feb. 10, 2017. The entire disclosure of each of the aforementioned patent applications are incorporated by reference herein.

FIELD OF THE INVENTION

The present invention pertains to carpets comprising a precoat composition based on a thermoplastic dispersion. The present invention further pertains to carpets and carpet products providing a fluid barrier to fluid penetration to the under surface upon which the carpet is positioned. More particularly, the present invention pertains to carpets and carpet products having a backing including a barrier impervious to fluid penetration. The present invention further pertains to carpets or carpet products having a structure that prevents fluid penetration through the carpet and have improved wet delamination. The present invention further pertains to methods of making such carpet or carpet product as described herein.

BACKGROUND OF THE INVENTION

Most conventional carpets comprise a primary backing with yarn tufts in the form of cut or uncut loops extending upwardly from the backing to form a pile surface. In the case of tufted carpets, the yarn is inserted into a primary backing by tufting needles and a binder (carpet coating) is applied thereto. In the case of non-tufted or bonded pile carpets, the fibers are embedded and actually held in place by the binder composition. In both cases, the carpet construction can also include a secondary backing bonded to the primary backing. The secondary backing provides extra padding to the carpet, absorbs noise, adds dimensional stability and often functions as a thermal insulator. Similar techniques are used in both the preparation of continuous (rolled) carpets as well as carpet tiles.

An important characteristic of carpet is the ability to exhibit good physical properties even when the carpet is exposed to fluids, such as moisture. Carpets can be routinely exposed to fluids from, for example, steam cleaning processes and even spills. In such situations, the wet strength of the carpet is important since inadequate wet strength can cause fraying of the carpet edges, fuzzing during wet cleaning or possibly delamination of the secondary backing from the carpet that can result in carpet buckling. Such surface changes in a carpet are undesirable and can reduce the useful lifetime of the carpet.

Furthermore, when a fluid, such as a beverage, accidentally spills onto the surface of the carpet the fluid flows through the carpet to the back of the carpet and soaks all the way through contaminating the underlying surfaces. Fluid penetration of carpets also presents a difficult situation for anyone who keeps a dog or a cat as a pet. It is also an issue in healthcare facilities where penetrations of blood, urine or other bodily fluids into and through a carpet represent a problem. In hospitality applications, such as restaurants, stain penetration is a constant dilemma. It is universally recommended, by the carpet manufacturers, to clean up spills promptly, but it also generally recognized that it is highly impracticable to clean and absorb the spills before at least some of the fluid has penetrated though the backing to the sub-floor. This often leads to possible permanent odors, stains, formation and entrapment of bacteria, and other potentially carpet destroying problems.

For the carpet precoat compositions, for example, the physical properties of the binders are important to their successful utilization as carpet coatings. In this regard, there are a number of important requirements, which must be met by such coatings. The coating must be capable of being applied to the carpet and dried using the processes and equipment conventionally employed in the carpet industry. The precoat composition must provide excellent adhesion to the pile fibers to secure them firmly in the backing. The precoat composition also must provide an excellent adhesion to all other parts of a carpet structure, such as any additional backings and adhesive layers present in the carpet structure.

Accordingly, there is still a need to obtain carpets and carpet products exhibiting improved wet delamination strength of the carpet and carpet product, as well as exhibiting an improved resistance to fluid penetration. It would be further desirable to have a carpet or a carpet product comprising a precoat composition that when applied to a carpet structure result in improved wet delamination strength of the carpet structure. Still further it would be desirable to have a carpet or carpet product having a backing including a barrier impervious to fluid penetration. Still further, there is a need for the manufacture of such carpets or carpet products. These needs and other needs are at least partially satisfied by the present invention.

SUMMARY OF THE INVENTION

In accordance with the purpose(s) of the invention, as embodied and broadly described herein, the invention, in one aspect, relates to a carpet comprising: a) a greige good comprising: i) a primary backing having a face and a back surface; ii) a plurality of fibers attached to the primary backing material and extending from the face of the primary backing material and exposed at the back side of the primary backing material; and b) a precoat composition applied to the back surface of the primary backing material; and c) a secondary backing system adjacent to the precoat composition, wherein the secondary backing system comprises: i) a secondary backing layer having a first surface and a second surface; and ii) a polymer film applied to the second surface of the secondary backing material.

Also disclosed herein is a method of making a carpet comprising: a) providing a greige good comprising: i) a primary backing component having a face surface and a back surface; and ii) a plurality of fibers attached to the primary backing component and extending from the face surface of the primary backing component; b) applying a precoat composition to the back surface of the primary backing component to provide a precoated greige good; c) applying a first surface of a secondary backing layer to the precoated back surface of the primary backing component; and d) applying a polymer film to the second surface of the secondary backing layer.

Additional aspects of the invention will be set forth, in part, in the detailed description, and claims which follow, and in part will be derived from the detailed description, or can be learned by practice of the invention. It is to be

DETAILED DESCRIPTION OF THE INVENTION

Figure 1:
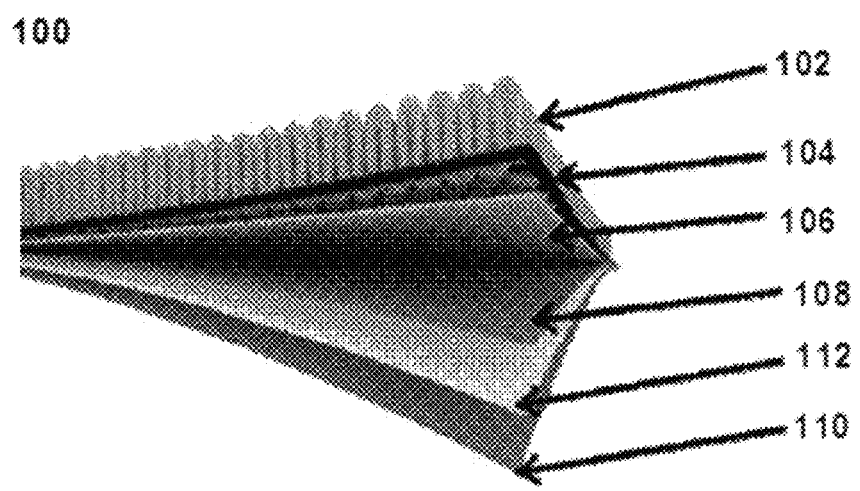
FIG. 1 shows an exemplary inventive carpet structure as described herein.

The present invention can be understood more readily by reference to the following detailed description, examples, drawings, and claims, and their previous and following description. However, before the present compositions, articles, devices, systems, and/or methods are disclosed and described, it is to be understood that this invention is not limited to the specific compositions, articles, devices, systems, and/or methods disclosed unless otherwise specified, as such can, of course, vary. It is also to be understood that the terminology used herein is for the purpose of describing particular aspects only and is not intended to be limiting.

The following description of the invention is also provided as an enabling teaching of the invention in its best, currently known aspect. To this end, those of ordinary skill in the relevant art will recognize and appreciate that changes and modifications can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the relevant art will recognize that many modifications and adaptations to the present invention are possible and can even be desirable in certain circumstances and are thus also a part of the present invention. Thus, the following description is provided as illustrative of the principles of the present invention and not in limitation thereof.

Various combinations of elements of this disclosure are encompassed by this invention, e.g. combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

It is also to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used herein, the singular forms "a," "an" and "the" include plural referents unless the context clearly dictates otherwise. Thus, for example, reference to a "polymer" includes aspects having two or more polymers unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event or circumstance may or may not occur, and that the description includes instances where said event or circumstance occurs and instances where it does not.

"Carpet composition" is used herein in the manner as would be recognized by one of ordinary skill in the art. The definition of carpet composition as used herein includes any known in the art carpet products. As an example, and without limitation, the term "carpet composition" includes carpet tiles, rugs, and turfs. As used herein, and unless the context clearly indicates otherwise, the term carpet composition is used to generically include broadloom carpets and area rugs. To that "broadloom carpet" means a broadloom textile flooring product manufactured for and intended to be used in roll form.

The definition of carpet composition herein does not include products that would be known to one of ordinary skill in the art as "resilient flooring." As an example, products that fall under the category of resilient flooring include, but are not limited to, linoleum, vinyl tiles, cork tiles, rubber tiles and floor mats.

As used herein, the term "by weight," when used in conjunction with a component, unless specially stated to the contrary is based on the total weight of the formulation or composition in which the component is included. For example, if a particular element or component in a composition or article is said to have 8% by weight, it is understood that this percentage is in relation to a total compositional percentage of 100%.

A weight percent of a component, or weight %, or wt. %, unless specifically stated to the contrary, is based on the total weight of the formulation or composition in which the component is included.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

In some instances, the parts per weight of a component is based on the weight of the composition "on a dry basis," and thus, refers to "dry parts," which indicates the parts per weight of the composition without water or any other liquid or fluid. For example, the composition of the precoat in a finished product can be expressed in the dry parts.

In other instances, the parts per weight of a component is based on the weight of the composition "on a wet basis," and thus, refers to "wet parts," which indicates the parts per weight of the composition in the presence of water or any other liquid or fluid as defined. For example, the composition of the precoat in a blended or compounded form can be expressed in the wet parts.

As used herein, the term "substantially," in, for example, the context "substantially free" refers to a composition having less than about 1% by weight, e.g., less than about 0.5% by weight, less than about 0.1% by weight, less than about 0.05% by weight, or less than about 0.01% by weight of the stated material, based on the total weight of the composition.

It is further understood that the term "substantially," when used in reference to a composition, refers to at least about 60% by weight, e.g., at least about 65%, at least about 70%, at least about 75%, at least about 80%, at least about 85%, at least about 90%, at least about 91%, at least about 92%, at least about 93%, at least about 94%, at least about 95%, at least about 96%, at least about 97%, at least about 98%, at least about 99%, or about 100% by weight, based on the total weight of the composition, of a specified feature or component.

As used herein, the term "substantially," in, for example, the context "substantially identical reference composition," refers to a reference composition comprising substantially identical components in the absence of an inventive component. In another exemplary aspect, the term "substantially," in, for example, the context "substantially identical reference composition," refers to a reference composition comprising substantially identical components and wherein an inventive component is substituted with a common in the art component. For example, a substantially identical reference carpet composition can comprise a substantially identical plurality of reference fibers attached to the reference primary backing material and extending the face of the reference primary backing material and exposed at the back side of the reference primary backing material, a reference precoat composition comprising latex, and wherein a thermoplastic dispersion is absent from the precoat composition; and a substantially identical reference secondary backing material applied to a back surface of the reference precoat layer; and a substantially identical reference polymer film.

As used herein, the term "substantially," in, for example, the context "substantially similar wet and dry delamination strength," refers to values of wet delamination strength that are different from values of dry delamination strength by about 30% or less, by about 20% or less, by about 10% or less, by about 5% or less, by about 1% or less, or by about 0.5% or less.

The term "fiber" as used herein includes fibers of extreme or indefinite length (i.e. filaments) and fibers of short length (i.e., staple fibers).

The term "yarn" as used herein refers to a continuous strand or bundle of fibers.

As used herein, the term "copolymer" refers to a polymer formed from two or more different repeating units (monomer residues). By way of example and without limitation, a copolymer can be an alternating copolymer, a random copolymer, a block copolymer, or a graft copolymer.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

The term "homogeneous ethylene polymer" as used to describe ethylene polymers is used in the conventional sense in accordance with the original disclosure by Elston in U.S. Pat. No. 3,645,992, the disclosure of which is incorporated herein by reference. As defined herein, homogeneous ethylene polymers include both substantially linear ethylene polymers and homogeneously branched linear ethylene.

Homogeneously branched ethylene polymer is homogeneous ethylene polymer that refers to an ethylene polymer in which the monomer or comonomer is randomly distributed within a given polymer or interpolymer molecule and wherein substantially all of the polymer or interpolymer molecules have substantially the same ethylene to comonomer molar ratio with that polymer or interpolymer.

Alternatively, homogeneously branched ethylene polymers can be defined as homogeneous ethylene polymers that possess short chain branches and characterized by a relatively high short chain branching distribution index (SCBDI) or relatively high composition distribution branching index (CDBI). That is, the ethylene polymer has a SCBDI or CDBI greater than or equal to 50 percent, greater than or equal to 70 percent, or greater than or equal to 90 percent and essentially lack a measurable high density (crystalline) polymer fraction.

In the aspects wherein the homogeneously branched ethylene polymers are characterized by the short chain branching distribution index or composition distribution branching index, the SCBDI or CDBI can be defined as the weight percent of the polymer molecules having a comonomer content within 50 percent of the median total molar comonomer content and represents a comparison of the comonomer distribution in the polymer to the comonomer distribution expected for a Bernoullian distribution. The SCBDI or CDBI of polyolefins can be conveniently calculated from data obtained from techniques known in the art, such as, for example, temperature rising elution fractionation (abbreviated herein as "TREF") as described, for example, by Wild et al., *Journal of Polymer Science, Poly. Phys. Ed.*, Vol. 20, p. 441 (1982), L. D. Cady, "The Role of Comonomer Type and Distribution in LLDPE Product Performance," SPE Regional Technical Conference, Quaker Square Hilton, Akron, Ohio, October 1-2, pp. 107-119 (1985), or in U.S. Pat. Nos. 4,798,081 and 5,008,204, the disclosures of all of which are incorporated herein by reference. In some aspects, the comonomer distribution of the polymer and SCBDI or CDBI are determined using $^{13}$CNMR analysis in accordance with techniques described, for example, in U.S. Pat. No. 5,292,845 and by J. C Randall in Rev. Macromol. Chem.

Phys., C29, pp. 201-317, the disclosures of which are incorporated herein by reference.

In some aspects, the terms "homogeneously branched linear ethylene polymer" and "homogeneously branched linear ethylene/α-olefin polymer" means that the olefin polymer has a homogeneous or narrow short branching distribution but does not have long chain branching. That is, the linear ethylene polymer is a homogeneous ethylene polymer characterized by an absence of long chain branching. Such polymers can be made using polymerization processes (e.g., as described by Elston in U.S. Pat. No. 3,645,992) which provide a uniform short chain branching distribution (i.e., homogeneously branched). Homogeneously branched linear ethylene polymers are typically characterized as having a molecular weight distribution, $M_w/M_n$, of less than about 3, less than about 2.8, or less than about 2.3. Commercial examples of suitable homogeneously branched linear ethylene polymers include those sold by Mitsui Petrochemical Industries as Tafmer™ resins and by Exxon Chemical Company as Exact™ resins and Exceed™ resins. Alternatively, the terms "homogeneously branched linear ethylene polymer" and "homogeneously branched linear ethylene/α-olefin polymer" means that the olefin polymer has a relatively high SCBDI or CDBI.

The terms "homogeneous linearly branched ethylene polymer" or "homogeneously branched linear ethylene/α-olefin polymer" do not refer to high pressure branched polyethylene which is known to those skilled in the art to have numerous long chain branches. The term "homogeneous linear ethylene polymer" generically refers to both linear ethylene homopolymers and to linear ethylene/α-olefin interpolymers. A linear ethylene/α-olefin interpolymer possesses short chain branching and the α-olefin is typically at least one $C_3$-$C_{20}$ α-olefin (e.g., propylene, 1-butene, 1-pentene, 4-methyl-1-pentene, 1-hexene, and 1-octene). In other aspects the polyethylenes that are suitable for use in the present invention are interpolymers of ethylene with at least one $C_3$-$C_{20}$ α-olefin and/or $C_4$-$C_{18}$ diolefin. Copolymers of ethylene and α-olefin of $C_3$-$C_{20}$ carbon atoms can be used.

The term "interpolymer" is used herein to indicate a copolymer, or a terpolymer, or the like, where at least one other comonomer is polymerized with ethylene to make the interpolymer. Suitable unsaturated comonomers useful for polymerizing with ethylene include, for example, ethylenically unsaturated monomers, conjugated or non-conjugated dienes, polyenes, etc. Examples of such comonomers include $C_3$-$C_{20}$ α-olefins as propylene, isobutylene, 1-butene, 1-hexene, 4-methyl-1-pentene, 1-heptene, 1-octene, 1-nonene, 1-decene, 1,9-decadiene and the like. Other suitable monomers include styrene, halo- or alkyl-substituted styrenes, tetrafluoroethylene, vinylbenzocyclobutane, 1,4-hexadiene, 1,7-octadiene, and cycloalkenes, e.g., cyclopentene, cyclohexene and cyclooctene.

When used in reference to an ethylene homopolymer (i.e., a high density ethylene polymer not containing any comonomer and thus no short chain branches), the term "homogeneous ethylene polymer" or "homogeneous linear ethylene polymer" means the polymer was made using a homogeneous catalyst system such as, for example, that described Elston or Ewen or those described by Canich in U.S. Pat. Nos. 5,026,798 and 5,055,438, or by Stevens et al. in U.S. Pat. No. 5,064,802, the disclosures of all three of which are incorporated herein by reference.

The terms "substantially linear ethylene polymer" or "SLEP," are used interchangeably, and refer specifically to homogeneously branched ethylene polymers that have long chain branching. The term does not refer to heterogeneously or homogeneously branched ethylene polymers that have a linear polymer backbone. For substantially linear ethylene polymers, the long chain branches have the same comonomer distribution as the polymer backbone, and the long chain branches can be as long as about the same length as the length of the polymer backbone to which they are attached. The polymer backbone of substantially linear ethylene polymers is substituted with about 0.01 long chain branches/1000 carbons to about 3 long chain branches/1000 carbons, from about 0.01 long chain branches/1000 carbons to about 1 long chain branches/1000 carbons, and from about 0.05 long chain branches/1000 carbons to about 1 long chain branches/1000 carbons.

Long chain branching is defined herein as a chain length of at least 6 carbons, above which the length cannot be distinguished using $^{13}C$ nuclear magnetic resonance spectroscopy. The presence of long chain branching can be determined in ethylene homopolymers by using $^{13}C$ nuclear magnetic resonance (NMR) spectroscopy and is quantified using the method described by Randall (Rev. Macromol. Chem. Phys., C29, V. 2&3, p. 285-297), the disclosure of which is incorporated herein by reference.

Substantially linear ethylene polymers are homogeneously branched ethylene polymers and are disclosed in U.S. Pat. Nos. 5,272,236 and 5,278,272, the disclosures of which are incorporated herein by reference. Homogeneously branched substantially linear ethylene polymers are available from The Dow Chemical Company as AFFINITY™ polyolefin plastomers and from Dupont Dow Elastomers JV as ENGAGE™ polyolefin elastomers. Homogeneously branched substantially linear ethylene polymers can be prepared via the solution, slurry, or gas phase polymerization of ethylene and one or more optional α-olefin comonomers in the presence of a constrained geometry catalyst, such as the method disclosed in European Patent Application 416,815-A, the disclosure of which is incorporated herein by reference. In some aspects, a solution polymerization process is used to manufacture the substantially linear ethylene polymer used in the present invention.

The term "heterogeneously branched ethylene polymer" refers to a polymer having a distribution of branching different from and broader than the homogeneous branching ethylene/α-olefin interpolymer at similar molecular weight. In further aspects, the "heterogeneous" and "heterogeneously branched" mean that the ethylene polymer is characterized as a mixture of interpolymer molecules having various ethylene to comonomer molar ratios. Alternatively, heterogeneously branched linear ethylene polymers can be defined as having a SCBDI less than about 50% and more typically less than about 30%. HBEPs and SLEPs also differ from the class of polymers known conventionally as heterogeneously branched traditional Ziegler polymerized linear ethylene interpolymers, for example, ultra low density polyethylene ("ULDPE"), very low density polyethylene ("VLDPE"), linear low density polyethylene ("LLDPE") medium density polyethylene ("MDPE") or high density polyethylene ("HDPE") made, for example, using the technique disclosed by Anderson et al. in U.S. Pat. No. 4,076,698, in that substantially linear ethylene interpolymers are homogeneously branched interpolymers. Further, in accordance with the present invention, the polymer composition does not comprise more than 20% by weight of heterogeneously branched linear ethylene polymers, as measured by the total weight of the polymer composition.

Heterogeneously branched ethylene polymers are typically characterized as having molecular weight distributions, $M_w/M_n$ in the range of from about 3.5 to about 4.1 and, as such, are distinct from substantially linear ethylene polymers and homogeneously branched linear ethylene polymers in regards to both compositional short chain branching distribution and molecular weight distribution.

The substantially linear ethylene polymers useful in this invention have excellent processability, even though they have relatively narrow molecular weight distributions (MWDs). Furthermore, the melt flow ratio ($I_{10}/I_2$) of the substantially linear ethylene polymers can be varied essentially independently of the polydispersity index (i.e., molecular weight distribution ($M_w/M_n$)). This is contrasted with conventional heterogeneously branched linear polyethylene resins which have rheological properties such that as the polydispersity index increases, the $I_{10}/I_2$ value also increases. The rheological properties of substantially linear ethylene polymers also differ from homogeneously branched linear ethylene polymers which have relatively low, essentially fixed $I_{10}/I_2$ ratios.

HBEPs and SLEPs also differ significantly from the class known as free-radical initiated highly branched high pressure low density ethylene homopolymer and ethylene interpolymers such as, for example, ethylene-acrylic acid (EAA) copolymers, and ethylene-vinyl acetate (EVA) copolymers, in that substantially linear ethylene polymers do not have equivalent degrees of long chain branching and are made using single site catalyst systems rather than free-radical peroxide catalyst systems. In accordance with the present invention, the polymer composition does not comprise more than 20% by weight of free-radical initiated highly branched high pressure low density ethylene homopolymer and ethylene interpolymers, as measured by the total weight of the polymer composition, exclusive of any adhesive polymer that contains such homopolymers and interpolymers (as discussed in more detail below).

As described herein, in some aspects to determine the wet and/or dry strength, the Tuft Bind Test according to ASTM D-1335 is used. The Tuft Bind Test determines the amount of force that is necessary to pull the yarn from its primary backing. It is desirable to obtain carpets with highest tuft bind values possible. It is understood that the carpet that withstands a high amount of force lasts longer, and the original appearance is preserved due to fewer snags.

As described herein, in some aspects to determine the wet and/or dry strength, the VELCRO® test is used. The VELCRO® test utilizes a VELCRO® tester to measure the carpet composition strength. VELCRO is a registered trademark for the well-known hook and loop fastening material. In the VELCRO® test, a two pound roller approximately three-and-a-half inches wide and one-and-a-half inches in diameter coated with VELCRO® hook material is rolled repeatedly over the loop pile of the carpet, for example, ten times. The carpet is then inspected for protruding fibers or fuzz. By "fuzz," it is meant short, individual filaments (often 1-3 stitch lengths long) removed from fiber bundles.

It is known that precoat adhesives, if properly applied, can provide sufficient binding of carpet fibers to permit manufacture of loop pile carpets which can pass the VELCRO® test. It is important that any proposal to replace the use of conventional adhesives be likewise capable of producing a carpet in which the face yarn or fibers are securely attached to the carpet.

As described herein, in some aspects to determine the wet and/or dry strength, delamination strength test according to ASTM D-3936 is utilized. The delamination strength test is design to measure an amount of force needed to remove a secondary backing from the carpet composition. The strength according to ASTM D-3936 is measured by determining the highest peak for each of the middle five inches of 6" pull (jaw separation) and averaging the values and is reported in pounds/inch (lb/in). It is further understood that the higher amount of force needed to remove a secondary backing from the carpet composition, the better durability of the carpet is expected.

In some exemplary aspects, to measure a wet delamination the sample is soaked in a liquid for a first predetermined time, dried for a second predetermined time, and then measured to determine the delamination strength. In some aspects, the first predetermined time and a second predetermined time can be same or different. In other aspects, the first or second predetermined time can be from greater than 0 min to about 120 minutes, including exemplary values of about 5 min, about 10 min, about 20 min, about 30 min, about 40 min, about 50 min, about 60 min, about 70 min, about 80 min, about 90 min, about 100 min, and about 110 min. In other exemplary aspects, to measure a wet delamination the sample is stored in the Environmental Chamber for 24 hours at 90° F. and 90% relative humidity and then measured to determine the delamination.

As described herein, in some aspects to determine the wet and/or dry delamination strength a test Area Under the Curve developed by Shaw Industries is utilized. According to the Area Under the Curve test, the samples are prepared and pulled similarly to the preparation techniques according to ASTM D-3936 and is reported in pounds/inch (lb/in). To calculate the delamination strength the entire pull area is included. The delamination strength is calculated under the curve starting at the first 0.5" and ending at 5.5' of jaw separation.

In some aspects of the present invention, woven textiles can be used. Woven textiles have the appearance of two-sets of parallel threads interlaced at generally right angles to each other in the plane of the fabric. "Warp" yarns lie along the length of the fabric and "weft" yarns lie in the transverse direction, i.e. across the width of the fabric. The type of yarns used to produce a woven textile can be monofilament, multifilament, a combination of each type, or slit film yarns. In some aspects of the invention, the term "tape-spun" yarn refers to yarn having a slit film yarn in the warp direction and spun (relatively short staple length) yarn in the weft direction. In other aspects of the invention, the term "tape-tape" yarn refers to yarn having a slit film yarn both in the warp and the weft directions.

As described herein, the term "semipermeable" refers to materials that do not allow certain substances to permeate but do allow certain other specified materials to pass through it. For example, and without limitation, a semipermeable fluid barrier can be permeable to gases and impermeable to liquids, or vice versa.

As described herein, the term "impermeable" refers to materials that do not allow the disclosed substances to pass through it. For example, and without limitation, a fluid impermeable material can be impermeable to both liquids and gases.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Carpets

The present invention may be understood more readily by reference to the following detailed description of various aspects of the invention and the examples included therein and to the Figures and their previous and following description.

In some aspects, the invention relates to a carpet comprising: a) a greige good comprising: i) a primary backing having a face and a back surface; ii) a plurality of fibers attached to the primary backing material and extending from the face of the primary backing material and exposed at the back side of the primary backing material; and b) a precoat composition applied to the back surface of the primary backing material; and c) a secondary backing system adjacent to the precoat composition, wherein the secondary backing system comprises: i) a secondary backing layer having a first surface and a second surface; and ii) a polymer film applied to the second surface of the secondary backing material.

In certain aspects, the present invention pertains to any carpet constructed with a primary backing component and includes tufted carpet and non-tufted carpet such as needle punched carpet. To form the tufted carpet, yarn is tufted through the primary backing component such that the longer length of each stitch extends through the face surface of the primary backing component.

A. Fibers

In some aspects, the plurality of fibers are present in yarn. In other aspects, the plurality of fibers are present as separate fibers. In some aspects, the plurality of fibers are present in tufts of yarn. In some aspects, a portion of the plurality of the fibers are exposed at the back surface of the primary backing component. In yet other aspects, a portion of the plurality of the fibers are exposed at the back surface of the primary backing component in a form of back stitches.

In some aspects, the plurality of fibers can comprise a polyamide, an olefin, or a polyester. The term "polyamide," as utilized herein, is defined to be any long-chain polymer in which the linking functional groups are amide (—CO—N—) linkages. The term polyamide is further defined to include copolymers, terpolymers and the like as well as homopolymers and also includes blends of two or more polyamides. In some aspects, the plurality of polyamide fibers comprise one or more of nylon 6, nylon 66, nylon 10, nylon 612, nylon 12, nylon 11, or any combination thereof. In other aspects, the plurality of polyamide fibers comprise nylon 6 or nylon 66. In yet other aspects, the plurality of polyamide fibers are nylon 6. In a yet further aspect, the plurality of polyamide fibers are nylon 66.

In certain aspects, the plurality of fibers comprise a polyester. The term "polyester fiber" as utilized herein, refers to the manufactured fiber in which the fiber forming substance is any long-chain synthetic polymer composed of at least 85% by weight of an ester of a substituted aromatic carboxylic acid, including but not restricted to substituted terephthalic units, $p(-R-O-CO-C_6H_4-CO-O-)_x$ and parasubstituted hydroxy-benzoate units, $p(-R-O-CO-C_6H_4-O-)_x$. In some aspects, the plurality of the polyester fibers comprise polyethylene terephthalate (PET) homopolymers and copolymers, polybutylene terephthalate (PBT) homopolymers and copolymers, and the like, including those that contain comonomers such as cyclohexanedimethanol, cyclohexanedicarboxylic acid, and the like.

In yet further aspects, the plurality of fibers can comprise a polyolefin fiber. As defined herein, the term "polyolefin" refers to any class of polymers produced from a simple olefin (also called an alkene with the general formula $C_nH_{2n}$) as a monomer. In some aspects, the polyolefins which can be used to produce the yarn and fibers include, but are not limited to, polyethylene, polypropylene, both homopolymer and copolymers, poly(1-butene), poly(3-methyl-1-butene), poly(4-methyl-1-pentene) and the like, as well as combinations or mixtures of two or more of the foregoing. In certain aspects, the plurality of the polyolefin fibers comprise polyethylene or polypropylene. In other aspects, the plurality of the polyolefin fibers comprise polyethylene. In yet other aspects, the plurality of the polyolefin fibers comprise polypropylene.

In yet further aspects, the plurality of fibers can further comprise natural fibers, acrylics, viscose, rayon, cellulose acetate, linen, silk, cotton, wool, or any combination thereof.

As understood by one of ordinary skill in the art, the plurality of fibers can comprise any types or forms of fibers. For example, and without limitation, the plurality of fibers can comprise staple fibers or bulked continuous filament fibers.

In certain aspects, the precoat layer is applied to a back surface of the primary backing component. The layer of the precoat composition can be used to lock the plurality of fibers or tufts in place. In some aspects, the precoat layer can provide additional strength to the tufts (so-called tuft bind strength). In yet other aspects, the precoat layer can be used to substantially prevent any additional adhesive compositions from penetration through (the openings between) the plurality of fibers (the tufts) in the direction of the carpet top face.

B. Primary Backings

In certain aspects, the primary backing component comprises a polyolefin, a polyester, a polyamide, or a combination thereof. The primary backing component can be woven and non-woven. In certain aspects, the primary backing component can comprise non-woven webs, or spunbonded materials. In some aspects, the primary backing component can comprise a combination of woven and non-woven materials. In some aspects, the primary backing component comprises a polyolefin polymer. In other aspects, the polyolefin polymer comprises polypropylene. In yet other aspects, the primary backing component is a slit film polypropylene sheet such as that sold by Propex or Synthetic Industries owned by Shaw Industries. In yet further aspects, the primary backing component can comprise polyester. In still further aspect, the primary backing component can comprise polyamide. In yet further aspects, the primary backing component can comprise a combination of polyamide and polyester. In the certain aspects, the polyamide is nylon. In some other aspects, the primary backing can comprise a woven polyethylene terephthalate (PET). In yet other aspects, the primary backing can comprise a woven PET having a post-consumer and/or post-industrial content.

In certain aspects, the primary backing component is a spun-bond primary backing component. The spun bond backing can be produced by depositing extruded, spun filaments onto a collecting belt in a uniform random manner followed by bonding the fibers. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. In some aspect, the spun-bond primary backing component can comprise a bi-component filament of a sheath-core type. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polyester can comprise polyethylene terephthalate, polybutylene terephthalate, or polyparaphenylene terephthalamide. In yet other aspects, the polymeric core comprises polyethylene terephthalate. In further aspects, the sheath polymer can comprise a polyamide, polyethylene, or polyester. In yet further aspects, the sheath polymer comprises nylon. In still further aspects, the sheath-core primary backing component comprises a polyester as a core component and nylon as a sheath component. The exemplary sheath-core primary backing component can be commercially available from Bonar. In yet other aspects, a polyester non-woven primary backing can be commercially available from Freudenberg.

C. Precoat

In some aspect, the precoat composition comprises a thermoplastic dispersion. In yet other aspects, the precoat composition comprises a polyolefin dispersion.

In still further aspects, the precoat layer comprises an aqueous precoat material. In some exemplary aspects, the aqueous precoat material can, for example, be added as a dispersion or as an emulsion. In certain aspects, a precoat emulsion can be made from various polyolefin materials such as, for example and without limitation, ethylene acrylic acid (EAA), ethylene vinyl acetate (EVA), polypropylene or polyethylene (e.g., low density polyethylene (LDPE), linear low density polyethylene (LLDPE) or substantially linear ethylene polymer, or mixtures thereof). In some aspects, the precoat layer can comprise latex. It is further contemplated that the precoat material in the precoat layer can be selected from a group comprising, without limitation, an EVA hotmelt, a vinyl acetate ethylene (VAE) emulsion, carboxylated styrene-butadiene (XSB) latex copolymer, a styrene-butadiene resin (SBR) latex, a BDMMA latex, an acrylic latex, an acrylic copolymer, a styrene copolymer, butadiene acrylate copolymer, a polyolefin hotmelt, polyurethane and/or emulsions, and any combination thereof.

In still further aspects, the precoat composition comprises a latex. In yet other aspects, where precoat comprise the latex composition, the latex further comprises a carboxylated styrene-butadiene (XSB) latex copolymer, a styrene-butadiene resin (SBR) latex, a BDMMA latex, an acrylic latex, an acrylic copolymer, a styrene copolymer, or a combination thereof.

In some aspects, where the thermoplastic dispersion is present, the thermoplastic dispersion can have a total solids content in the range of from about 30 to about 80%, including exemplary values of about 35%, about 40%, about 45%, about 50%, about 55%, about 60%, about 65%, about 70%, and about 75%. In some other aspects, the thermoplastic dispersion can have a total solids content in the range from about 30% to about 60%, from about 40% to about 50%, or from about 45% to about 55%. It is understood that a total solids content is controlled by an amount of a liquid medium present in the thermoplastic dispersion. In some exemplary aspects, the liquid medium comprises water. In other aspects, the liquid medium can comprise a non-aqueous liquid. In some aspects, the non-aqueous liquid can comprise organic solvents. In some aspects, the organic solvents can comprise any polar organic solvents. In yet other aspects, the organic solvents can comprise any non-polar organic solvents.

In some other aspects, any precoat composition disclosed herein can have a total solids content in the range of from about 50% to about 90%, including exemplary value of about 55%, about 60%, about 65%, about 70%, about 75%, about 80%, and about 85%. In yet other aspects, the precoat composition can have a total solids content in the range from about 40% to 60%, or from about 65% to about 85%.

In some aspects, the thermoplastic dispersion present in the precoat composition is a polyolefin dispersion. In certain aspect, the thermoplastic composition can be present in an amount in the range of from about 20% to about 90% by weight of the composition, including exemplary values of about 25%, about 30%, about 35%, about 40%, about 45%, about 50%, about 55%, about 60%, about 65%, about 70%, about 80%, and about 85%. In yet other aspects, the thermoplastic composition can be present in an amount in the range from about 25% to about 50%, or from about 30% to about 70%. In yet other aspects, the polyolefin dispersion is present in an amount in the range from about 25% to about 50%, or from about 40% to about 70%.

In yet other aspects, the thermoplastic dispersion precoat composition is substantially free of latex. In still further aspects, the thermoplastic dispersion precoat composition is substantially free of ethylene acrylic acid (EAA), or ethylene vinyl acetate (EVA). In yet other aspects, the thermoplastic dispersion precoat composition is substantially free of an EVA hotmelt, a vinyl acetate ethylene (VAE) emulsion, carboxylated styrene-butadiene (XSB) latex copolymer, a styrene-butadiene resin (SBR) latex, a BDMMA latex, an acrylic latex, an acrylic copolymer, a styrene copolymer, butadiene acrylate copolymer, polyurethane, or any combination thereof.

In certain aspects, the thermoplastic composition comprises a dispersion of a propylene block copolymer, ethylene block copolymer, or a combination thereof. In some aspects, the thermoplastic composition can comprise more than one polyolefin. In certain aspects, the polyolefins can comprise alpha-olefin polymers and copolymers, such as ethylene alpha-olefin copolymers and propylene alpha-olefin copolymers. In some aspects, the thermoplastic composition can comprise ethylene-propylene-diene terpolymers. In certain aspects, the polyolefins can include high density polyethylenes ("HDPE"), heterogeneously branched linear low density polyethylenes ("LLDPE"), heterogeneously branched ultra low linear density polyethylenes ("ULDPE"), homogeneously branched, linear ethylene/alpha-olefin copolymers ("HBPE"); homogenously branched, substantially linear ethylene/alpha-olefin copolymers ("SLEP"); high pressure, free radical polymerized ethylene polymers and copolymers such as low density polyethylenes. ("LDPE"). In some aspects, the thermoplastic comprise polymeric units derived from one or more alpha-olefin comonomers. Exemplary comonomers can include $C_2$, and $C_4$ to $C_{10}$ alpha-olefins, for example: $C_2$, $C_4$, $C_6$, and $C_8$ alpha-olefins.

In some aspects, the polyolefin dispersions can comprise a polymer blend. In some embodiments, the blend may comprise two different Ziegler-Natta polymers. In other embodiments, the blend may comprise a Ziegler-Natta polymer and a metallocene polymer. In still other embodiments, the blend may comprise two different metallocene polymers.

In some further aspects, the precoat compositions described herein can further comprise a stabilizing agent, such as a surfactant, a polymer having a polar group as either a comonomer or a grafted monomer, and mixtures thereof. Examples of surfactants that can be useful as a stabilizing agent include cationic surfactants, anionic surfactants, and no-ionic surfactants. In certain aspects, where thermoplastic dispersions are present, an optional base can be included in the thermoplastic dispersion. Examples of bases that can be used include alkaline metals and alkaline earth metals, inorganic amines; oxides, hydroxide and hydride of alkaline metals and alkaline earth metals; and weak acid salts of alkaline metals and alkaline earth metals.

In some exemplary aspects, the thermoplastic dispersions described herein are commercially available from the DOW Chemical Company, under the tradename HYPOD™.

In some aspects, the precoat composition can comprise a filler. In certain aspects, the filler can be present in an amount from about 20% to about 90% by weight of any precoat composition described herein, including exemplary values of about 25%, about 30%, about 35%, about 40%, about 45%, about 50%, about 55%, about 60%, about 65%, about 70%, about 75%, about 80%, and about 85%. In yet other aspects, the filler can be present in any amount from about 25% to about 50%, from about 45% to about 85%, or from about 55% to about 90%.

In yet other aspects, the filler can be present in an amount from about 100 to about 700 dry parts based on 100 dry parts of the thermoplastic dispersion or the latex, including exemplary values of about 150, about 200, about 250, about 300, about 350, about 400, about 450, about 500, about 550, about 600, and about 650 dry parts based on 100 dry parts of thermoplastic dispersion or the latex. It is understood that the filler can be present in any amount between any two foregoing values. In still further aspects, the filler can be present in an amount form about 150 to about 550 dry parts based on 100 dry parts of the thermoplastic composition or the latex, or from about 150 to about 350 dry parts based on 100 dry parts of the thermoplastic composition or the latex.

In some aspects, the filler in the precoat composition can comprise one or more fillers. In some aspects, the filler can be derived from any recycled compositions. In certain aspects, the filler can be derived from recycled carpet content. In yet other aspects, the filler can be derived from recycled asphalt content. In yet other aspects, the filler can be derived from any recycled composition that can provide a substantial amount of inorganic material that can be utilized as a filler. In some aspects, the filler comprises a recycled calcium carbonate.

In certain aspects, exemplary and non-limiting fillers that can be present in the precoat composition can include calcium carbonate, flyash, residual by products from the depolymerization of Nylon 6 (also referred to as ENR co-product), recycled calcium carbonate (e.g., reclaimed calcium carbonate), aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof, in addition to the inorganic materials present in the inorganic filler composition discussed above.

In yet other aspects, the filler can comprise one or more of calcium carbonate, aluminum trihydrate, barite, feldspar, cullet, fly ash, kaolin clay, limestone, asphalt, or any combination thereof. In some other aspects, the filler can further comprise bentonite, montmorillonite, attapulgite clays, or any combination thereof. In yet other aspects, kaolin clay can be substituted or used in combination with bentonite, montmorillonite, or attapulgite clays.

In some aspects, the filler can comprise a kaolin clay. In yet other aspects, the kaolin clay can comprise a plurality of particles, wherein each of the plurality of particles is surface modified. In some aspects, the each of the plurality of particles is surface modified by calcination. In yet other aspects, the each of the plurality of particles is surface modified by utilizing a coupling agent, for example and without limitation silane. In some other aspects, silane coupling agent can be functionalized by mercapto-, polysulfide-, amino- and vinyl- groups. It is further understood that any known in the art coupling agent can be used to surface modify kaolin particles. In yet some other aspects, the each of the plurality of particles can be surface modified both by calcination and use of a coupling agent.

In some aspects, the filler comprises a kaolin clay slurry. In these aspects, the kaolin clay slurry can have a total solids content from about 50% to about 90%, including exemplary values of about 55%, about 60%, about 65%, about 70%, about 75%, about 80%, and about 85%. In yet other aspects, the kaolin clay slurry has a total solids content from about 55% to about 85%, or about 60% to about 80%. It is understood that a total solids content is controlled by an amount of a liquid medium present in the kaolin clay slurry. In some exemplary aspects, the liquid medium comprises water. In yet other aspects, any liquid medium known in the art and capable of making a dispersion or a slurry with the kaolin clay can be utilized. In some aspects, liquid medium can be nonaqueous. In yet other aspects, the slurry can comprise plasticizers.

In certain aspects, the filler comprises calcium carbonate and kaolin clay slurry. In some aspects, the calcium carbonate and kaolin clay slurry are present in the fillers in a substantially equal amount when measured in dry parts based on 100 dry parts of the thermoplastic dispersion. In other aspects, the calcium carbonate and kaolin clay slurry are present in the filler in any ratio when measured in dry parts based on 100 dry parts of the thermoplastic dispersion or the latex. In some aspects, the calcium carbonate and kaolin clay slurry are present in the filler in a ratio of 1:1, 1:2, 1:3, 1:4, 1:5, 1:6, 1:7, 1:8, 1:9, 1:10, 10:1, 9:1, 8:1, 7:1, 6:1, 5:1, 4:1, 3:1, or 2:1, when measured in dry parts based on 100 dry parts of the thermoplastic dispersion or the latex.

In some aspects, the kaolin clay slurry present in the filler comprises a plurality of particles having a particle size from about $0.1\mu$ to about $5\mu$, including exemplary values of about $0.2\mu$, about $0.3\mu$, about $0.4\mu$, about $0.5\mu$, about $0.6\mu$, about $0.7\mu$, about $0.8\mu$, about $0.9\mu$, about $1.0\mu$, about $1.5\mu$, about $2.0\mu$, about $2.5\mu$, about $3.0\mu$, about $3.5\mu$, about $4.0\mu$, and about $4.5\mu$.

In certain aspect, the precoat composition can further comprise one or more flame retardants. Exemplary flame retardants that can be present in the precoat composition include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the precoat composition and the selection of such amount will depend, in part, upon the particular flame retardant used, as well as the desired level of flame retardance to be achieved. Such amounts can be readily determined through no more than routine experimentation.

In still a further aspect, the precoat composition can further comprise other ingredients. For example, a surfactant can be included in the precoat composition. Suitable surfactants can include, for example and without limitation, nonionic, anionic, cationic and fluorosurfactants. In certain aspects, the surfactant is present in an amount from greater than 0% to about 5% by weight based on the total weight of the composition. In yet other aspects, the surfactant is present in exemplary amounts such as about 0.01%, about 0.05%, about 0.1%, about 0.5%, about 1%, about 1.5%, about 2%, about 2.5%, about 3%, about 3.5%, about 4%, and about 4.5%. In yet other aspects, the surfactant can be present in an amount from greater than 0% to about 4%, or from about 0.05% to about 4.5%.

In another example, the precoat composition can further comprise a rheology agent, a defoaming agent, and/or a dispersion enhancer. In some aspect, the rheology agent comprises a thickener. In these aspects, the thickener helps to provide a suitable viscosity to the dispersion. For example, the thickener can exemplarily comprise sodium and ammonium salts of polyacrylic acids. In some aspects, the rheology agent is present in an amount from greater than 0% and about 5% based on the total weight of the precoat composition, including exemplary values of about 0.01%, about 0.05%, about 0.1%, about 0.5%, about 1%, about 1.5%, about 2%, about 2.5%, about 3%, about 3.5%, about 4%, and about 4.5%. In yet other aspects, the rheology agent can be present in an amount from greater than 0% to about 2%, or from about 0.05% to about 4%.

In other aspects, the defoaming agent can, without limitation, be a non-silicone defoaming agent and is present in an amount greater than 0% and about 5.0% based on the total weight of the precoat composition, including exemplary values of about 0.01%, about 0.05%, about 0.1%, about 0.5%, about 1%, about 1.5%, about 2%, about 2.5%, about 3%, about 3.5%, about 4%, and about 4.5%. In yet other aspects, the defoaming agent can be present in an amount from greater than 0% to about 4%, or from about 0.05% to about 4.5%. An exemplified dispersion enhancer can be a fumed silica that acts as a compatibilizer for the dispersion.

In these aspects, the fumed silica can be present at between about 0.1 and about 0.2% percent based on the total weight of the precoat composition.

In yet other aspects, the precoat composition can comprise a surfactant and a rheology agent. In the aspects where both the surfactant and the rheology agents are present, the amounts of the surfactant and the rheology agent can be in any value from any range described above.

In some other aspects, the precoat composition can further comprise wax. In some aspects, wax comprises petroleum based waxes, animal based waxes, plant based waxes, or any combination thereof. In some aspects, wax present in the precoat composition as a fine homogeneous dispersion in a liquid medium. In some aspects, the liquid medium is water. In another aspect, the liquid medium is any medium known in the art capable of forming a dispersion with wax. Without wishing to be bound by any theory, it is hypothesized that wax presence in the precoat composition can impart some hydrophobicity to reduce moisture or spill penetration through the product.

In some aspects, the precoat composition can be substantially free of a tackifier. In yet other aspects, the precoat composition can comprise tackifier.

In some aspects, the precoat composition comprising the thermoplastic dispersions can exhibit stable properties both when cold blended or hot blended. As used herein, a "cold blend" precoat composition refers to a precoat composition that has been blended at mild refrigeration. In some exemplary aspects, the cold blend precoat composition refers to the precoat composition blended at a temperature from about 30° F. to about 50° F., including exemplary values of about 35° F., about 40° F., and about 45° F. In some aspects, the precoat exhibits stable properties when stored at mild refrigeration. In yet other aspects, the precoat exhibits stable properties when stored in a cold climate.

As used herein, a "hot blend" precoat composition refers to a precoat composition has been blended at mildly elevated temperatures. In some exemplary aspects, the hot blend composition refers to the precoat composition blended at a temperature from about 80° F. to about 150° F., including exemplary values of about 85° F., about 90° F., about 100° F., about 105° F., about 110° F., about 115° F., about 120° F., about 125° F., about 130° F., about 135° F., about 140° F., and about 145° F. In some aspects, the precoat exhibits stable properties when stored at elevated temperatures. In yet other aspects, the precoat exhibits stable properties when stored in a warm climate.

In some aspects, the precoat composition, cold or hot blended can exhibit a viscosity in the range from about 2,000 to about 15,500 cP when measured at 20 rpm, including exemplary values of about 2,500 cP, about 3,000 cP, about 3,500 cP, about 4,000 cP, about 4,500 cP, about 5,000 cP, about 5,500 cP, about 6,000 cP, about 6,500 cP, about 7,000 cP, about 7,500 cP, about 8,000 cP, about 8,500 cP, about 9,000 cP, about 9,500 cP, about 10,000 cP, about 10,500 cP, about 11,000 cP, about 11,500 cP, about 12,000 cP, about 12,500 cP, about 13,000 cP, about 13,500 cP, about 14,000 cP, about 14,500 cP, and about 15,000 cP. In yet other aspects, the precoat composition exhibits a viscosity from about 2,500 cP to about 4,500 cP, or from about 3,500 cP to about 5,500 cP when measured at 20 rpm.

In yet other aspects, the precoat composition comprising the thermoplastic dispersion can exhibit a viscosity after a storage period of at least 3 days, at least one week, at least 2 weeks, or at least one month that is within +/−20% of an initial viscosity measured before the storage period. In yet other aspects, the precoat composition can exhibit a viscosity after a storage period of at least 3 days, at least one week, at least 2 weeks, or at least one month that is within +/−10% of an initial viscosity measured before the storage period. In yet other aspects, the precoat composition comprising the thermoplastic dispersion can exhibit a viscosity after a storage period of at least 3 days, of at least one week, at least 2 weeks, or at least one month that is within +/−5% of an initial viscosity measured before the storage period. It is understood that in some aspects, a storage period of this precoat composition can be determine by a possible microbial decomposition of the composition.

In certain aspects, the precoat composition is present in an amount of less than about 30 oz/sy, including exemplary values of less than about 20 oz/sy, about 15 oz/sy, less than about 10 oz/sy, less than about 8 oz/sy, less than about 6 oz/sy, less than about 4 oz/sy. In still other aspects, the precoat composition can be present in an amount of greater than about 4 oz/sy, greater than about 6 oz/sy, greater than about 8 oz/sy, greater than about 10 oz/sy, greater than about 15 oz/sy, greater than about 20 oz/sy or about 30 oz/sy.

In certain exemplary aspects, the precoat composition comprising the thermoplastic dispersion can comprise a blend comprising: a) from about 25% to 50% by weight polyolefin dispersion; b) from 45% to 85% by weight filler; c) from greater than 0% to 4% surfactant, and from greater than 0% to 2% rheology agent. In yet other aspects, the blend can further comprise any of disclosed above additional additives, for example, and without limitation it can further comprises, flame retardants, surfactants, rheology agents, defoaming agents, colors, pigments, waxes, and the like.

D. Secondary Backing

In certain aspects, the first surface of the secondary backing layer is adhered to the back surface of the primary backing by the precoat composition.

In some aspects of the invention, the carpet comprises a secondary backing having a first surface and a second surface, wherein the first surface of the secondary backing is adhered to the back surface of the primary backing component by the adhesive compositions. In one aspect the secondary backing comprises a woven material. In another aspect, the secondary backing comprises a tape-tape yarn, or a tape-spun yarn. In certain aspects, the secondary backing is a tape-tape yarn woven material. In one aspect, the secondary backing comprises a polyolefin. In a yet further aspect, the polyolefin comprises polypropylene. In certain exemplary aspects, the material for the secondary backing material can be a conventional material, for example and without limitation, the woven polypropylene fabric sold by Propex. Such secondary backings can comprise a material that is a leno weave with polypropylene tape running in one direction and polypropylene spun yarn running in the other. In other aspects, the secondary backing material used with the present invention is a woven polypropylene fabric with monofilaments running in both directions. A suitable example of such a material is manufactured by Shaw Industries, Inc. under the designation Style S8880.

In further aspects, the secondary backing material is a material known as fiber lock weave or "FLW." FLW is a fabric which includes fibers needle punched into it. Sometimes FLW is used as a primary backing component on a carpet with a low pile weight.

In some aspects, the secondary backing can be a woven needle punched polypropylene fabric such as SoftBac® manufactured by Shaw Industries, Inc. In this exemplary aspect, this material has been enhanced by having about 1.5 ounce/sq. yard of polypropylene fibers or polyethylene terephthalate fibers needle punched onto one side of it and has a total basis weight of about 3.5 ounce/sq. yard. This needle punched fabric can be laminated so as to have the polypropylene fibers embedded within the adhesive backing layer. In still further aspects other materials can be used for the secondary backing, for example, and without limitation, if an integral pad is desired, a polyurethane foam or other cushion material can be laminated to the back side of the carpet. Such backings can be used for broadloom carpet.

In yet other aspects, the secondary backing comprising a non-woven material. In certain aspects, the secondary backing can comprise a spunbond non-woven material. The spunbond backing can be produced by depositing extruded, spun filaments onto a collecting belt in a uniform random manner followed by bonding the fibers. The fibers are separated during the web laying process by air jets or electrostatic charges. The collecting surface is usually perforated to prevent the air stream from deflecting and carrying the fibers in an uncontrolled manner. Bonding imparts strength and integrity to the web by applying heated rolls or hot needles to partially melt the polymer and fuse the fibers together. Since molecular orientation increases the melting point, fibers that are not highly drawn can be used as thermal binding fibers. In some aspect, the spun-bond secondary backing component can comprise a bi-component filament of a sheath-core type. In some aspects, the polymeric core component can have a higher melting point than the polymeric sheath component. In some aspects, the polymeric core component can comprise polyester, aliphatic polyamides, polyphenylene oxide and/or co-polymers or blends thereof. In yet other aspects, the polyester can comprise polyethylene terephthalate, polybutylene terephthalate, or polyparaphenylene terephthalamide. In yet other aspects, the polymeric core comprises polyethylene terephthalate. In further aspects, the sheath polymer can comprise a polyamide, polyethylene, or polyester. In yet further aspects, the sheath polymer comprises nylon. In still further aspects, the sheath-core primary backing component comprises a polyester as a core component and nylon as a sheath component. The exemplary sheath-core secondary backing component can be commercially available from Bonar. In yet other aspects, a polyester non-woven secondary backing can be commercially available from Freudenberg.

In some aspects, the secondary backing material can comprise a thermoplastic polyolefin. In certain aspects, the secondary backing material comprises substantially linear ethylene polymers and homogeneously branched linear ethylene polymers (i.e., homogeneously branched ethylene polymers). Homogeneously branched ethylene polymers (including substantially linear ethylene polymers in particular) have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE).

In some aspects, when properly selected substantially linear ethylene polymers or homogeneously branched linear ethylene polymers are used as the secondary backing materials, the low flexural modulus of these polymers offers advantages in ease of carpet installation and general carpet handling. Substantially linear ethylene polymers, in particular, when employed as a secondary backing material show enhanced mechanical adhesion to polypropylene which improves the consolidation and delamination resistance of the various carpet layers and components, i.e., polypropylene fibers, fiber bundles, the primary backing component. In some aspects, good abrasion resistance is especially important in commercial carpet cleaning operations as good abrasion resistance generally improves carpet durability.

In certain aspects, the secondary backing material comprising a substantially linear ethylene polymer or homogeneously branched linear ethylene polymer can provide a substantial fluid and particle barrier which enhances the hygienic properties of carpet.

In some further aspects, use of the secondary backing material comprising a substantially linear ethylene polymer or homogeneously branched linear ethylene polymer can allow totally recyclable carpet products particularly where the carpet comprises polypropylene fibers.

The secondary backing material can comprise a homogeneously branched ethylene polymer. The homogeneously branched ethylene polymer can have a single melting peak between −30° C. and 150° C., as determined using differential scanning calorimetry. In some aspects, the homogeneously branched ethylene polymer used in the secondary backing material of this invention, is a substantially linear ethylene polymer characterized as having (a) a melt flow ratio, $I_{10}/I_2 > 5.63$; (b) a molecular weight distribution, $M_w/M_n$, as determined by gel permeation chromatography and defined by the equation: $(M_w/M_n) < (I_{10}/I_2) - 4.63$; (c) a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the linear ethylene polymer has a homogeneously branched short chain branching distribution and no long chain branching, and wherein the substantially linear ethylene polymer and the linear ethylene polymer are simultaneously ethylene homopolymers or interpolymers of ethylene and at least one $C_3$-$C_{20}$ α-olefin and have the same $I_2$ and $M_w/M_n$ and wherein the respective critical shear rates of the substantially linear ethylene polymer and the linear ethylene polymer are measured at the same melt temperature using a gas extrusion rheometer; and (d) a single differential scanning calorimetry, DSC, melting peak between −30° and 150° C.

In certain aspects, the molecular weight distribution ($M_w/M_n$) for the substantially linear ethylene polymers and homogeneous linear ethylene polymers used in the present invention is generally from about 1.8 to about 2.8. Substantially linear ethylene polymers are known to have excellent processability, despite having a relatively narrow molecular weight distribution. Unlike homogeneously and heterogeneously branched linear ethylene polymers, the melt flow ratio ($I_{10}/I_2$) of substantially linear ethylene polymers can be varied essentially independently of their molecular weight distribution, $M_w/M_n$.

In some aspects, the secondary backing material comprising homogeneously branched ethylene polymers includes interpolymers of ethylene and at least one α-olefin prepared by a solution, gas phase, or slurry polymerization process, or combinations thereof. In some aspects the α-olefins are represented by the following formula:

CH$_2$=CHR where R is a hydrocarbyl radical. Further, R may be a hydro-carbyl radical having from one to twenty carbon atoms and as such the formula includes $C_3$-$C_{20}$ α-olefins. In other aspects, α-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoro-ethylene, vinyl benzocyclobutene, 1,4-hexadiene, 1,7-octadiene, and cycloalkenes, e.g., cyclopentene, cyclo-hexene and cyclooctene. In certain aspects, the comonomer will be 1-butene, 1-pentene, 4-methyl-1-pentene, 1-hexene, 1-heptene, 1-octene, or mixtures thereof, as secondary backing materials comprised of higher α-olefins will have especially improved toughness. In yet other aspects, the comonomer will be 1-octene and the ethylene polymer will be prepared in a solution process.

In certain aspects, the density of the substantially linear ethylene polymer or homogeneously branched linear ethylene polymer, as measured in accordance with ASTM D-792, does not exceed about 0.92 g/cc, and is generally in the range from about 0.85 g/cc to about 0.92 g/cc, from about 0.86 g/cc to about 0.91 g/cc, and from about 0.86 g/cc to about 0.90 g/cc.

In yet further aspects, the molecular weight of the homogeneously branched linear ethylene polymer or substantially linear ethylene polymer can be characterized using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the homogeneously branched linear ethylene polymer or substantially linear ethylene polymer is generally from about 1 grams/10 minutes (g/10 min) to about 500 g/10 min, about 2 g/10 min to about 300 g/10 min, from about 5 g/10 min to about 100 g/10 min, from about 10 g/10 min to about 50 g/10 min, and about 25 to about 35 g/10 min.

In some other aspects, an additional measurement can be useful in characterizing the molecular weight of the homogeneous linear ethylene polymer or the substantially linear ethylene polymer and can be performed using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene polymer, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene polymer is at least about 6.5, at least about 7, or at least about 8. The $I_{10}/I_2$ ratio of the homogeneously branched linear ethylene polymer is generally less than about 6.3.

In some aspects, the ethylene polymers can have a relative low modulus. That is, the ethylene polymer is characterized as having a 2% secant modulus less than about 24,000 psi (163.3 MPa), less than about 19,000 psi (129.3 MPa), and less than about 14,000 psi (95.2 MPa), as measured in accordance with ASTM D790.

In certain aspects, the ethylene polymers described herein are substantially amorphous or totally amorphous. That is, the ethylene polymer is characterized as having a percent crystallinity less than about 40 percent, less than about 30 percent, more less than about 20, and less than about 10 percent, as measured by differential scanning calorimetry using the equation:

percent crystallinity %=($H_f$/292)×100, where $H_f$ is the heat of fusion in Joules/gram.

In other aspects, the homogeneously branched ethylene polymer (HBEP) can be used alone or can be blended or mixed with one or more synthetic or natural polymeric material. In some aspects, the polymers for blending or mixing with homogeneously branched ethylene polymers used in the present invention include, but are not limited to, another homogeneously branched ethylene polymer, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted homogeneously branched ultra low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

In further aspects, the secondary backing material can comprise a blend of at least two polyethylenes, wherein the polyethylene can comprise a homogeneously branched ethylene polymer (HBEP) or a substantially linear ethylene polymer (SLEP), or mixtures thereof. In other aspects, the secondary backing material can comprise a blend of at least three or four, or more polyethylenes, wherein the polyethylenes comprise a homogeneously branched ethylene polymer (HBEP) or a substantially linear ethylene polymer (SLEP), or mixtures thereof. Still further, the secondary backing material can comprise a polyethylene comprising at least about 80% by weight of at least one (or two or more) HBEP or SLEP as measured by weight of the polyethylene, including exemplary values of about 85, 90, 95, 97, 98, or about 99% by weight of the polyethylene, where any value can comprise an upper or a lower endpoint, as appropriate.

In the aspects, where the blend of at least two (or three or more) polyethylenes is used, the amount of each polyethylene can be individually varied in the amounts of, for example, from about 1, 5, 10, 15, 20, 25, 30, 35, 40, 45, 50, 55, 60, 65, 70, 75, 80, 85, 90, 95, 97 or about 98% by weight of the total blend, where any value can be used for the individual components, and any value can be used as an upper or a lower endpoint, as appropriate.

The density of the polyethylene components in the blend can be from about 0.860, 0.870, 0.880, 0.885, 0.890, 0.895, 0.900, 0.905, or about 0.910 g/cc, where any value can comprise an upper or a lower endpoint, as appropriate.

The actual blending or mixing of various polymers may be conveniently accomplished by any technique known in the art including, but not limited to, melt extrusion compounding, dry blending, roll milling, melt mixing such as in a Banbury mixer and multiple reactor polymerization. In some aspects, the blends or mixtures include a homogeneously branched ethylene polymer and a heterogeneously branched ethylene α-olefin interpolymer, wherein the α-olefin is a $C_3$-$C_8$ α-olefin prepared using two reactors operated in parallel or in series with different catalyst systems employed in each reactor. Multiple reactor polymerizations are described in copending applications U.S. Ser. No. 08/544,497, filed Oct. 18, 1995 and U.S. Ser. No. 08/327,156, filed Oct. 21, 1994, the disclosures of all three of which are incorporated herein by reference. In some aspects, multiple reactor polymerizations comprise non-adiabatic solution loop reactors as described in provisional applications U.S. Ser. No. 60/014,696 and U.S. Ser. No. 60/014,705, both filed Apr. 1, 1996, the disclosures of all of which are incorporated herein by reference.

In another aspect, the secondary backing material can comprise a modified homogeneously branched ethylene polymer. In particular, in certain aspects of the invention the at least one homogeneously branched ethylene polymer that can be present within the secondary backing material can be modified by the addition of at least one adhesive polymeric additive. Suitable adhesive polymeric additives include, for example and without limitation, polymer products comprised of (1) one or more ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitriles e.g., acrylamide, acrylonitrile, methacrylonitrile and fumaronitrile; and (2) one or more ethylenically unsaturated hydrocarbon monomers such as aliphatic α-olefin monomers, e.g., ethylene, propylene, butene-1 and isobutene; conjugated dienes, e.g., butadiene and isoprene; and monovinylidene aromatic carbocyclic monomers, e.g., styrene, α-methylstyrene, toluene, and t-butylstyrene.

A modified homogeneously branched ethylene polymer for use in the secondary backing materials can be conveniently prepared by known techniques such as, for example, by interpolymerization or by a polymerization procedure followed by a chemical or extrusion grafting procedure. Suitable grafting techniques are described in U.S. Pat. Nos. 4,762,890; 4,927,888; 4,230,830; 3,873,643; and 3,882,194, the disclosures of all of which are incorporated herein by reference.

In some aspects, the adhesive polymeric additives for use in the present invention can include maleic anhydride grafts wherein maleic anhydride is grafted onto an ethylene polymer at a concentration of about 0.1 to about 5.0 weight percent, about 0.5 to about 1.5 weight percent. The presence of ethylene polymer/maleic anhydride grafts as adhesive polymeric additives in the present invention can improve the performance and operating window of extrusion coated homogeneously branched ethylene polymers as the secondary backing material, especially when used in connection with polar polymers such as for example, but is not limited to, nylon and polyester faced carpets. The improvement pertained to substantially higher comparative abrasion resistance and tuft bind strength. In an exemplary aspect, a composition for forming a maleic anhydride graft is the Amplify® GR 204 available from Dow Chemicals.

In further aspects, the ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. In some aspects, the host ethylene polymers have a polymer density greater than or equal to about 0.86 g/cc, 0.87 g/cc, 0.88 g/cc, 0.89 g/cc, 0.90 g/cc, 0.91 g/cc, 0.92 g/cc, 0.93 g/cc, or greater than or equal to about 0.94 g/cc. In yet other aspects, the substantially linear ethylene polymers and high density polyethylene are utilized as host ethylene polymers.

In some aspects, it is contemplated that the secondary backing material to be extruded or applied by any other technique known in the art. In some aspects, the secondary backing material of this invention may optionally include exemplary additives such as foaming agents, pH controllers, flame retardants, fillers, tackifiers, wetting agents, dispersing agents, anti-microbial agents, lubricants, dyes, anti-oxidants, and the like, which are well known to those skilled in the art, without loss of the characteristic properties.

In one aspect, the secondary backing material can further comprise one or more flame retardants sufficient to ensure the carpet structure satisfies the requirements of the radiant flux floor covering test according to the ASTM-E648 testing procedures. In particular, according to certain aspects, the carpet compositions of the present invention exhibit a Class 1 critical radiant flux of greater than 0.45 watts per $cm^2$ as measured according to ASTM-E648. According to other aspects of the invention, the carpet compositions described herein can exhibit a Class 2 critical radiant flux in the range of from 0.22 to 0.44 watts per $cm^2$ as measured according to ASTM-E648. In still further aspects, the carpet compositions of the present invention can exhibit an unclassifiable critical radiant flux of less than 0.22 watts per $cm^2$ as measured according to ASTM-E648.

Exemplary flame retardants that can be incorporated into the secondary backing materials of the present invention include, without limitation, organo-phosphorous flame retardants, red phosphorous magnesium hydroxide, magnesium dihydroxide, hexabromocyclododecane, bromine containing flame retardants, brominated aromatic flame retardants, melamine cyanurate, melamine polyphosphate, melamine borate, methylol and its derivatives, silicon dioxide, calcium carbonate, resourcinol bis-(diphenyl phosphate), brominated latex base, antimony trioxide, strontium borate, strontium phosphate, monomeric N-alkoxy hindered amine (NOR HAS), triazine and its derivatives, high aspect ratio talc, phosphated esters, organically modified nanoclays and nanotubes, non-organically modified nanoclays and nanotubes, ammonium polyphosphate, polyphosphoric acid, ammonium salt, triaryl phosphates, isopropylated triphenyl phosphate, phosphate esters, magnesium hydroxide, zinc borate, bentonite (alkaline activated nanoclay and nanotubes), organoclays, aluminum trihydrate (ATH), azodicarbonamide, diazenedicarboxamide, azodicarbonic acid diamide (ADC), triaryl phosphates, isopropylated triphenyl phosphate, triazine derivatives, alkaline activated organoclay and aluminum oxide. Any desired amount of flame retardant can be used in the secondary backing material of the instant invention and the selection of such amount will depend, in part, upon the particular flame retardant used and desired carpet applications. Such amounts can be readily determined through no more than routine experimentation.

Exemplary and non-limiting fillers that can be incorporated into the secondary backing materials of the present invention can include calcium carbonate, fly-ash, recycled calcium carbonate, aluminum trihydrate, talc, nano-clay, barium sulfate, barite, barite glass fiber, glass powder, glass cullet, metal powder, alumina, hydrated alumina, clay, magnesium carbonate, calcium sulfate, silica, glass, fumed silica, carbon black, graphite, cement dust, feldspar, nepheline, magnesium oxide, zinc oxide, aluminum silicate, calcium silicate, titanium dioxide, titanates, glass microspheres, chalk, calcium oxide, and any combination thereof. In one aspect, the secondary backing material comprises inorganic filler with high heat content. In some aspects, it is for the filler to exhibit relatively high heat content. Examples of such fillers include, but are not limited to, calcium carbonate, aluminum trihydrate, talc, and barite. The exemplified high heat content fillers allow the extrudate to remain at elevated temperatures longer with the beneficial result of providing enhanced encapsulation and penetration. In this aspect, the high heat content fillers should be ground or precipitated to a size that can be conveniently incorporated in an extrusion coating melt stream. Exemplary non-limiting particle sizes for the inorganic filler material can include particle sizes in the range of from about 1 to about 50 microns. Still further, it should also be understood that the filler component can be present in any desired amount. However, in an exemplary aspect, the filler is present in an amount in the range of from about 10 weight % to about 90 weight %, based upon the total weight of the secondary backing material, including exemplary amounts of about 15 weight %, 20 weight %, 25 weight %, 30 weight %, 35 weight %, 40 weight %, 45 weight %, 50 weight %, 55 weight %, 60 weight %, 65 weight %, 70 weight %, 75 weight %, 80 weight %, and about 85 weight %. Still further, the amount of filler present can be in any range derived from any two of the above stated weight percentages.

In still another aspect, the secondary backing material can further comprise one or more tackifying additives. The tackifier can for example be tall oil or rosin based or, alternatively, can be an aliphatic or aliphatic aromatic hydrocarbon blend resin. As the tackifier is an optional component, the amount of tackifier can be, when present, in the range of from greater than 0 weight percent up to and even exceeding about 50 weight % of the secondary backing material. For example, in one aspect, the amount of tackifier can be in the range of from about 5 weight % to about 45 weight %. In still another aspect, the amount of tackifier can be in the range of from about 10 weight % to about 20 weight %.

E. Film Barrier

As disclosed herein, the carpet can further comprise a polymer film that is laminated to the secondary backing.

In some aspects, the polymer film comprises a thermoplastic material. In yet other aspects, the polymer film is a thermoplastic film. In other aspects, the polymer film comprises polymers and copolymers of polyethylene, polypropylene, polyurethane, polyester, polyvinylchloride, nylon and polyethylene vinyl acetate. In yet other aspects, the polymer film comprises polyethylene, polypropylene, polyurethane, polyester, or polyvinylchloride, or a combination thereof. In a yet further aspect, the polymer film is polyethylene. In yet further aspects, the polymer film is a combination of polyethylene and polyester.

In certain aspects, the polymer film is an extruded film. In yet other aspects, the polymer film is a blown film. In a yet further aspect, the polymer film is a cast film. In a still further aspect, the polymer film is an engineered film. The term "engineered film" as used herein refers to a polymer film comprising same or different polymers and copolymers, wherein the film is formed by various techniques to ensure desirable properties. In some aspects, the engineered film is a reinforced film. In some aspects, and without limitation, the engineered reinforced film can comprise a plurality of layers of the same or different polymer or copolymer. In other aspects, the engineered film can comprise layers of polyethylene film sandwiched with a layer of polyester. In yet further aspects, the engineered film can comprise layers of polyethylene and polypropylene, or layers of polyethylene and chemically resistant ethylene vinyl alcohol (EVOH) copolymer. In certain aspects, the engineered film used in the current disclosure can be purchased from Raven Industries.

In still further aspects, the polymer film is a composite film comprising polyethylene and polypropylene. In yet other aspects, the polymer film can comprise a polypropylene core. In yet other aspects, the polymer composite film can comprise at least two layers. In other aspects, the polymer composite film can comprise at least three layers. It is understood that each layer of the polymer composite film can be same or different and can comprise any of the polymers listed above. In some aspects, the composite film comprises at least three layers, and wherein each outer layer of the composite film comprises polyethylene.

In some aspects, the polymer film disclosed herein is a fluid barrier. In yet other aspects, the polymer film is fluid impermeable. In yet other aspects, the polymer film is semipermeable material. In certain aspects, the polymer film is semipermeable to gases. In some aspects, the polymer film is semipermeable to all atmospheric gases. In exemplary aspects and without limitation, the polymer film is semipermeable to oxygen, hydrogen, carbon dioxide, carbon oxide, nitrogen, and the like. In yet other aspects, the polymer film is impermeable to gases. In certain aspects, the polymer film is impermeable, for example, and without limitations, to volatile organic compounds (VOCs), methane, carbon dioxide, carbon oxide, radon, gasoline, benzene and the like. In yet further aspects, the polymer film is impermeable to the vapors.

In certain aspect, the polymer film is impermeable to fluids. In one aspect, the polymer film is impermeable to aqueous fluids. In another aspect, the polymer film is impermeable to non-aqueous fluids. In a further aspect, the non-aqueous fluid is an organic fluid. In further exemplary aspects, the polymer film is impermeable to water, carbonate and non-carbonate beverages, juices, milk, wine, or any other alcohol substances, human or pet bodily fluids, food fluids, food processing fluids, rain, or snow.

As disclosed herein, in some aspects, the polymer film can have a thickness of less than about 6 mils. In other aspects, the polymer film can have a thickness of exemplary values of about 5.5 mils, about 5 mils, about 4.5 mils, about 4 mils, about 3.5 mils, about 3 mils, about 2.5 mils, about 2 mils, about 1.5 mils, about 1 mil, and about 0.5 mils. In other aspects, the polymer film can have a thickness in any range derived from any two of the above stated values. For example, and without limitation the polymer film can have thickness from about 1 mil to about 5.5 mils, or from about 2 mils to about 4 mils, or from about 1 mil to about 3.5 mils.

In some other aspect, the polymer film can have a thickness of greater than about 10 mils. In other aspects, the polymer film can have a thickness of exemplary values of about 10 mils, about 15 mils, about 20 mils, about 25 mils, about 30 mils, about 35 mils, about 40 mils, about 45 mils, about 50 mils, about 55 mil, about 60 mils, about 65 mils, about 70 mils, about 75 mils, about 80 mils, about 85 mils, about 90 mils, and about 100 mils. In other aspects, the polymer film can have a thickness in any range derived from any two of the above stated values. For example, and without limitation the polymer film can have thickness from about 10 mils to about 40 mils, or from about 30 mils to about 50 mils, or from about 30 mil to about 80 mils.

In some aspects, the polymer film is continuous. In other aspects, the polymer film is substantially free of perforations or pinholes. In yet other aspects, the polymer film is continuous and substantially free of perforations.

FIG. 1 schematically shows an exemplary inventive carpet composition of the present disclosure. Specifically, FIG. 1 demonstrates an exemplary carpet structure 100 as disclosed a described herein. A plurality of face fibers 102 present in a yarn is attached to or tufted into a primary backing component 104 and is extending from a face surface of the primary backing component. A precoat layer 106 is applied to the opposed back surface of the primary backing component and the back stiches of the face fibers 102. A secondary backing 108 is adhered to the primary backing by the precoat composition. An optional reinforcing material, such as a scrim, 112 can be present. A polymer film 110 is laminated to the secondary backing 108 and optionally the reinforcing material when present.

Figure 2A:
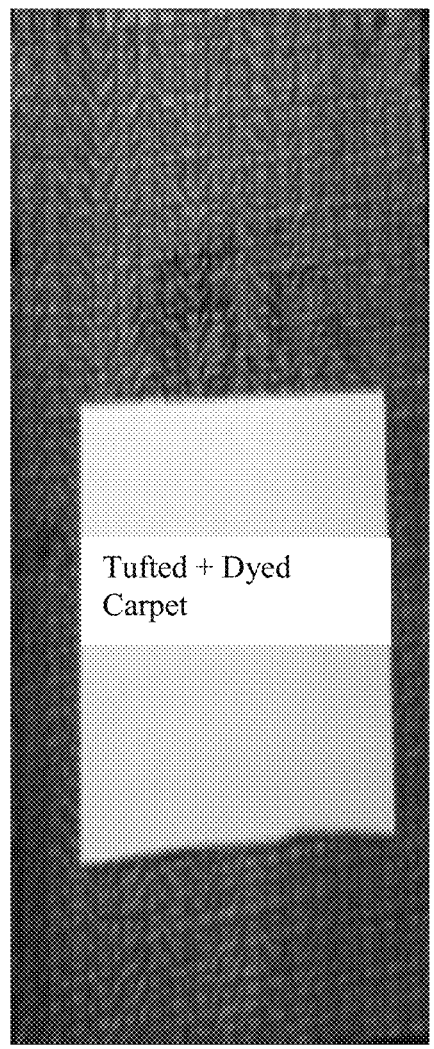
FIGS. 2(a)-(d) show photographs of a back side of an exemplary carpet structure after various processing steps.
Figure 2B:
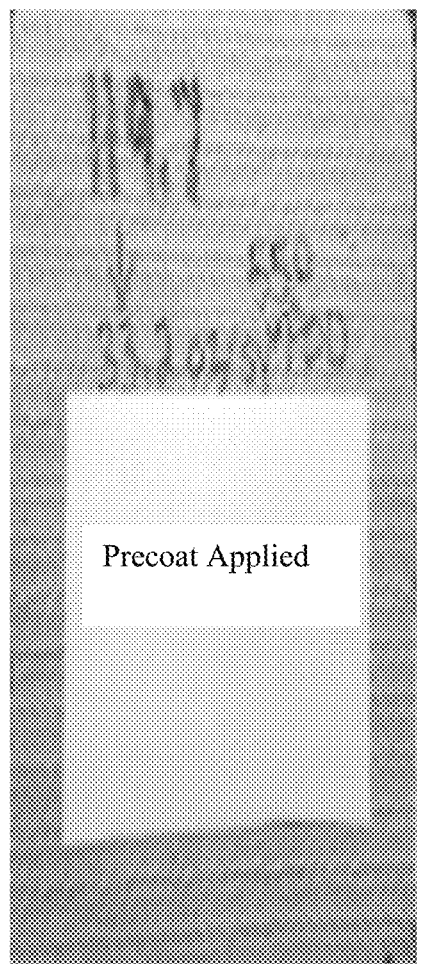
Figure 2C:
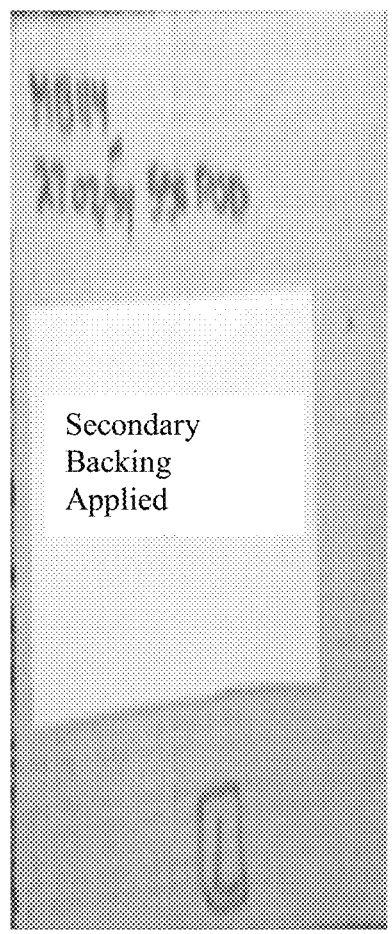
Figure 2D:
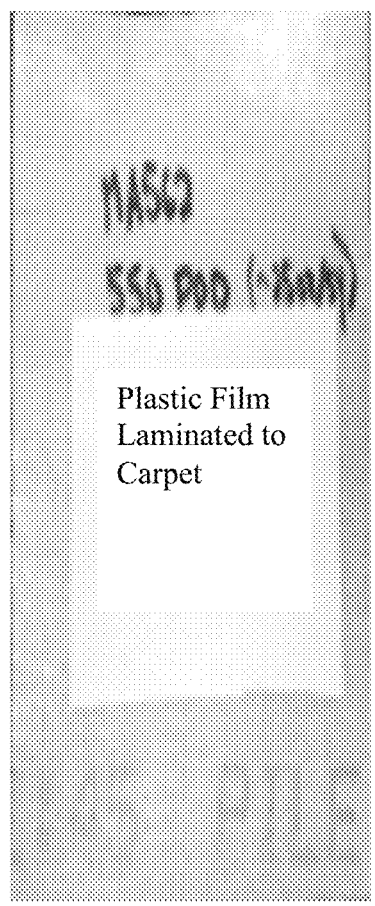

FIGS. 2(a)-(d) show photographs of a back side of an exemplary carpet structure after various processing steps. FIG. 2(a) shows the dyed fibers tufted into the primary backing. FIG. 2(b) shows the back side of the exemplary carpet structure after a precoat composition is applied to the primary backing. FIG. 2(c) shows the backs side of the exemplary carpet structure after application of the secondary backing, while FIG. 2(d) shows the backs side of the exemplary carpet structure with laminated to the secondary backing a polymer film. It is understood that in some aspects, an optional layer of the reinforcing material can be embedded between any layers of the carpet structure. In some aspects, the optional layer of the reinforcing material can be embedded between a precoated greige goods and secondary backing material. In yet other aspects, the optional layer of the reinforcing material can be embedded between a secondary backing and a film (for example, as shown in FIG. 1). The layer of reinforcing material has been found to enhance the dimensional stability of the carpet composition. Suitable reinforcing materials include dimensionally and thermally stable fabrics such as non-woven or wet-laid fiberglass scrims, as well as woven and non-woven thermoplastic fabrics (e.g. polypropylene, nylon and polyester). In some aspects, the reinforcement layer is a fiberglass scrim, for example, Duraglass that is commercially available from Johns Manville (about 2.0 oz/sq. yard). Alternatively, in other aspects, a reinforcement layer is a fiberglass scrim sold by Owens Corning (about 2.0 oz/sq. yard).

In certain aspects, the carpet composition disclosed herein comprises a carpet tile, a broadloom carpet, an area rug, or a synthetic turf. In yet other aspects, the carpet composition disclosed herein is a carpet tile, a broadloom carpet, an area rug, or a synthetic turf.

Performance Characteristics

It has been found that the inventive carpets compositions comprising a precoat composition and a polymer fluid film demonstrate exceptional wet strength properties. In some aspects, the carpet composition disclosed herein exhibits a wet delamination strength at an interface between the secondary backing layer first surface and the thermoplastic dispersion precoat composition, as measured according to ASTM D3936, that is greater than a wet delamination strength of a substantially identical reference carpet as measured according to ASTM D3936 at an interface between a referenced secondary backing layer first surface and a reference precoat composition, wherein the substantially identical reference carpet is substantially identical to the carpet but for the presence of an identical amount of a comparative latex containing precoat composition that is free of the thermoplastic dispersion.

In certain aspects, the carpet using the thermoplastic dispersion precoat composition can exhibit a wet delamination strength that is at least 25% greater than the wet delamination strength of the reference carpet that is substantially identical to the carpet but for the presence of an identical amount of a comparative latex containing precoat composition that is free of the thermoplastic dispersion.

In still other aspects, the carpet using the thermoplastic dispersion precoat composition can exhibit a wet delamination strength that is at least 50% greater than the wet delamination strength of the reference carpet that is substantially identical to the carpet but for the presence of an identical amount of a comparative latex containing precoat composition that is free of the thermoplastic dispersion.

In yet other aspects, the carpet exhibits a wet delamination strength at an interface between the secondary backing layer first surface and the latex precoat composition, as measured according to ASTM D3936, that is greater than a wet delamination strength of a substantially identical reference carpet as measured according to ASTM D3936 at an interface between a reference secondary backing layer first surface and a reference precoat composition, wherein the substantially identical reference carpet is substantially identical to the carpet but for the presence of the polymer film applied to the second surface of the secondary backing material.

In yet other aspects, the carpet composition exhibits a wet delamination strength at an interface between the secondary backing layer first surface and the thermoplastic dispersion precoat composition that is at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 120%, at least 150%, at least 170%, or at least 200% greater than the wet delamination strength of the reference carpet composition that is substantially identical to the carpet but for the presence of an identical amount of a comparative latex containing precoat composition that is free of the thermoplastic dispersion. In yet other aspects, the carpet composition disclosed herein exhibits a wet delamination strength in any range between any two of the foregoing endpoints.

In yet other aspects, the carpet composition exhibits a wet delamination strength at an interface between the secondary backing layer first surface and the latex precoat composition that is at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 120%, at least 150%, at least 170%, or at least 200% greater than the wet delamination strength of the reference carpet composition that is substantially identical to the carpet but for the presence of the polymer film applied to the second surface of the secondary backing material. In yet other aspects, the carpet composition disclosed herein exhibits a wet delamination strength in any range between any two of the foregoing endpoints.

In some aspects, the carpet composition disclosed herein exhibits a wet delamination strength at an interface between the secondary backing layer first surface and the precoat composition that is from about 2 pounds/inch to at least about 15 pounds/inch, including exemplary values of about 3 pounds/inch, about 4 pounds/inch, about 5 pounds/inch, about 6 pounds/inch, about 7 pounds/inch, about 8 pounds/inch, about 9 pounds/inch, about 10 pounds/inch, about 11 pounds/inch, about 12 pounds/inch, about 13 pounds/inch, and about 14 pounds/inch as measured according to ASTM D3936. It is understood that the precoat composition can comprise either the thermoplastic dispersion or the latex. In yet other aspects, the carpet composition disclosed herein exhibits a wet delamination strength in any range between any two of the foregoing endpoints.

In some aspects, the carpet composition disclosed herein exhibits a wet delamination strength at an interface between the secondary backing layer first surface and the precoat composition that is at least about 2 pounds/inch to at least about 15 pounds/inch, including exemplary values of at least about 3 pounds/inch, at least about 4 pounds/inch, at least about 5 pounds/inch, at least about 6 pounds/inch, at least about 7 pounds/inch, at least about 8 pounds/inch, at least about 9 pounds/inch, at least about 10 pounds/inch, at least about 11 pounds/inch, at least about 12 pounds/inch, at least about 13 pounds/inch, at least about 14 pounds/inch as measured according to ASTM D3936. It is understood that the precoat composition can comprise either the thermoplastic dispersion or the latex. In yet other aspects, the carpet composition disclosed herein exhibits a wet delamination strength in any range between any two of the foregoing endpoints In some other aspects, the carpet composition disclosed herein having a thermoplastic dispersion precoat composition can have substantially similar wet and dry delamination strength. In yet other aspects, this carpet composition can exhibit a wet delamination strength that is greater than its dry delamination strength. Without wishing to be bound by any theory, it is speculated that the exceptional wet delamination strength shown for this carpet composition is due to a possible bond formation between the thermoplastic dispersion present in the precoat composition and the secondary backing of the carpet composition.

In some other aspects, the carpet composition disclosed herein having a latex precoat composition can have substantially similar wet and dry delamination strength.

In some aspects, the carpet composition disclosed herein exhibits strength measured by Tuft Bind test from about 2 pounds to about 15 pounds, including exemplary values of about 3 pounds, about 4 pounds, about 5 pounds, about 6 pounds, about 7 pounds, about 8 pounds, about 9 pounds, about 10 pounds, about 11 pounds, about 12 pounds, about 13 pounds, and about 14 pounds. It is understood that the precoat composition can comprise either the thermoplastic dispersion or the latex. In yet other aspects, the carpet composition can exhibit strength measured by Tuft Bind test in any range between any two of the foregoing endpoints.

In certain aspects, the carpet composition disclosed is evaluated by a VELCRO® test for a visual degree of fuzzing, wherein the visible fuzzing ratings are based on appearance scale of 1 to 10. In some aspects, the fuzzing ratings for the carpet composition disclosed herein are from 1 to 10, including exemplary values of 2, 3, 4, 5, 6, 7, 8, and 9. It is understood that the precoat composition can comprise either the thermoplastic dispersion or the latex. In yet other aspects, the carpet composition can exhibit fuzzing ratings in any range between any two of the foregoing endpoints.

Methods of Making Carpets

In still further aspects, disclosed herein are the methods of making carpet compositions comprising the precoat compositions and polymer films.

In certain aspects, described herein is a method of making a carpet comprising (a) providing a greige good comprising: i) a primary backing component having a face surface an aback surface and ii) a plurality of fibers attached to the primary backing component and extending from the face surface of the primary backing component; b) applying a precoat composition to the back surface of the primary backing component to provide a precoated greige good; c) applying a first surface of a secondary backing layer to the precoated back surface of the primary backing component; and d) applying a polymer film to the second surface of the secondary backing layer.

In certain aspects, the step (c) is performed before step (d). In these aspects, the secondary backing layer can be adhered to the back surface of the primary backing by the precoat composition. In yet other aspects, the step (d) is performed by laminating the polymer film to the secondary backing layer.

The face of a tufted carpet can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, the tufting machine can be configured so as to cut only some of the loops, thereby leaving a pattern of cut and uncut loops. Whether loop, cut, or a hybrid, the yarn on the back surface of the primary backing component comprises tight, unextended loops. The combination of tufted yarn and a primary backing component without the application of an adhesive backing material or secondary backing material is referred to in the carpet industry as raw tufted carpet or greige goods. Greige goods become finished tufted carpet with the application of secondary backing materials or any other additional backings if present to the back surface of the primary backing material. In the aspects of the current invention, the greige goods become finished tufted carpet with the application of the secondary backing material. Finished tufted carpet can be prepared as broad-loomed carpet in rolls typically 6 or 12 feet wide. In some other aspects, broadloom carpet can be prepared in rolls 13'6" and 15' feet wide.

In another aspect, any conventional tufting or needle-punching apparatus and/or stitch patterns can be used to make the carpet compositions of the present invention. Likewise, it does not matter whether tufted yarn loops are left uncut to produce a loop pile; cut to make cut pile; or cut, partially cut and uncut to make a face texture known as tip sheared. After the yarn is tufted or needle-punched into the primary backing component, the greige good can be conventionally rolled up with the back surface of the primary backing component facing outward and held until it is transferred to the backing line.

The precoat composition can be applied as a precoat composition layer to the carpet composition in various ways. For example, the dispersion can be applied directly, such as with a roll over roller applicator, or a doctor blade. Alternatively, the precoat composition can be applied indirectly, such as with a pan applicator. It is contemplated that the amount of precoat applied and the concentration of the particles in the precoat can be varied depending on the desired processing and product parameters. In some aspects, the precoat composition layer is present in the carpet composition an amount of about 30 ounces/sq. yard or less, about 29 ounces/sq. yard or less, about 28 ounce/sq. yard or less, about 27 ounce/sq. yard or less, about 26 ounce/sq. yard or less, about 25 ounce/sq. yard or less, about 24 ounce/sq. yard or less, about 23 ounce/sq. yard or less, about 22 ounce/sq. yard or less, about 21 ounce/sq. yard or less, about 20 ounce/sq. yard or less, about 19 ounces/sq. yard or less, about 18 ounces/sq. yard or less, about 17 ounces/sq. yard or less, about 16 ounces/sq. yard or less, about 15 ounces/sq. yard or less, about 14 ounces/sq. yard or less, about 13 ounces/sq. yard or less, or about 12 ounces/sq. yard or less. In an exemplary aspect, a thermoplastic dispersion present in the precoat composition is the HYPOD™ 8502 from Dow Chemicals. In yet other aspects, the latex present in the precoat composition is SBR based latex or any other latex disclosed herein.

After application of the precoat composition layer, heat can be applied to the back side of the primary backing so as to dry, melt, and/or cure the composition. As a result, the loops of yarn can be at least partially fixed to the primary backing. Preferably, the heat is applied by passing the product through an oven.

After treatment with any precoat composition disclosed herein, a secondary backing material can be applied thereto. The additional backings can be applied by various methods. In some aspects, the secondary backing disclosed herein can be rolled on the precoat layer. In other aspects, the method can comprise the use of an extruded sheet of a thermoplastic material. In some aspects, a molten thermoplastic material can be extruded through a die so as to make a sheet which is as wide as the carpet composition.

Exemplary extrusion coating configurations can include, without limitation, a monolayer T-type die, single-lip die coextrusion coating, dual-lip die coextrusion coating, a coat hanger die, and multiple stage extrusion coating. Preferably, the extrusion coating equipment is configured to apply a total coating weight of from about 4 to about 60 ounces/yd$^2$ (OSY), including exemplary amounts of 5, 10, 15, 20, 25, 30, 35, 40, 45, 50 and 55 ounces/yd$^2$ (OSY), and any range of coating weights derived from these values. To that end, it should be understood that the desired coating weight of the extrusion coated layers will depend, at least in part, upon the amount of any flame retardants or inorganic fillers in the extrudate.

The extrusion coating melt temperature principally depends on the particular composition of the backing composition being extruded. When using the secondary backing composition describe herein is extruded, the extrusion coating melt temperature can be greater than about 350° F. and, in some aspects, in the range of from 350° F. to 650° F. In another aspect, the melt temperature can be in the range of from 375° F. to 600° F. Alternatively, the melt temperature can be in the range of from 400° F. to 550° F.

In further aspects, the carpet comprises a polymer film disposed on the second surface of the secondary backing. In some aspects, the polymer film is laminated to the second surface of the secondary backing. In other aspects, prior to step the film lamination the secondary backing of the preform carpet is heated. In some aspects, this step can be called a preheating step. In certain aspects, the preheating of the secondary backing can be done at a temperature between about 100° F. and about 200° F., including exemplary values of about 105° F., about 110° F., about 115° F., about 120° F., about 125° F., about 130° F., about 135° F., about 140° F., about 145° F., about 150° F., about 155° F., about 160° F., about 165° F., about 170° F., about 175° F., about 180° F., about 185° F., about 190° F., and about 195° F. In some aspects, the lamination can be done at a temperature from about 250 to about 400° F., including exemplary values of about 260° F., about 270° F., about 280° F., about 290° F., about 300° F., about 310° F., about 320° F., about 330° F., about 340° F., about 350° F., about 360° F., about 370° F., about 380° F., and about 390° F.

In certain aspects, the gap between two rolls can be any gap commonly utilized by lamination industry. In certain aspects, the gap can be between about 10 mil to about 250 mils, including exemplary values of about 15 mil, about 18 mil, about 20 mil, about 30 mil, about 50 mil, about 60 mil, about 70 mil, about 80 mil, about 90 mil, about 100 mil, about 110 mil, about 120 mil, about 130 mil, about 140 mil, about 150 mil, about 160 mil, about 170 mil, about 180 mil, about 190 mil, about 200 mil, about 210 mil, about 220 mil, about 230 mil, and about 240 mil.

In still further aspects, any pressure usually used in lamination industry can be applied. In some aspects, the pressure can be between 6,000 force lbs to about 9,000 force lbs, including exemplary values of about 6,500 force lbs, about 7,000 force lbs, about 7,500 force lbs, about 8,000 force lbs, and about 8,500 force lbs.

Figure 3:
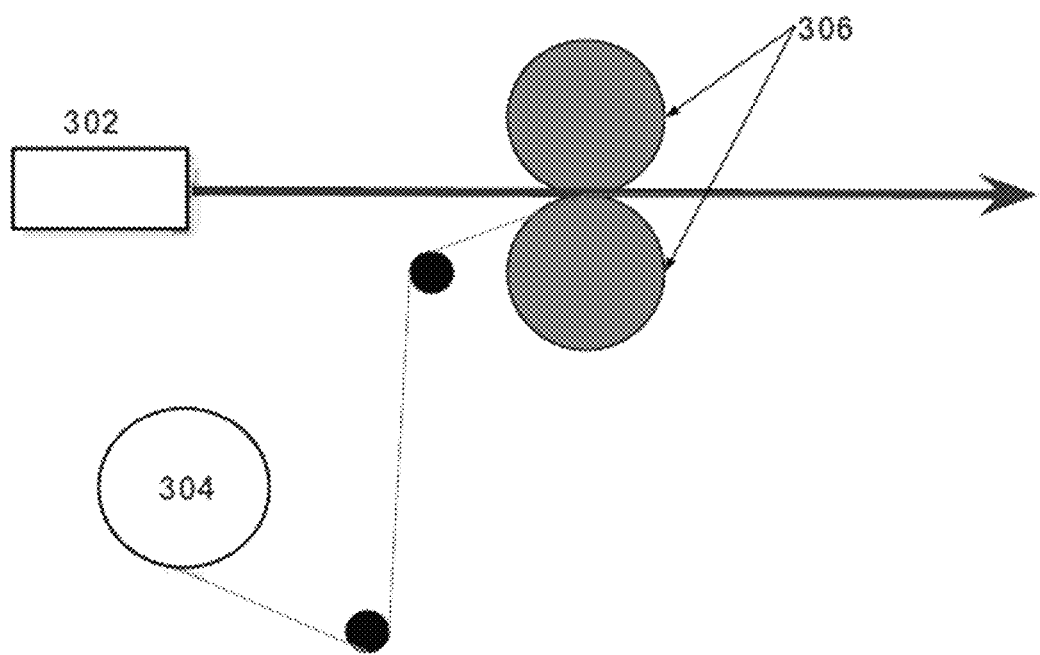
FIG. 3 shows a schematic illustration of an exemplary aspect of a method of making a carpet.

FIG. 3 shows a schematic of an exemplary method of making the inventive carpet. The greige good with adhered by the precoat composition the secondary backing 302 is fed to the manufacturing line. The polymer film 304 is fed from a roll and disposed on the second surface of the secondary backing and then is passed through lamination rolls 306 to form the carpet.

Any known in the art lamination equipment can be used, for example, equipment sold by Union Tool Corporation. An exemplary lamination equipment that can be used is a Union Tool Hot Roll Laminator MD #20962.

In certain aspects, the polymer film can be provided simultaneously with the secondary backing and then co-laminated to the primary backing component. In other aspects, the polymer film is separately disposed on the second surface of the secondary backing prior to laminating the secondary backing to the greige goods. In these exemplary aspects, the polymer film disposed on the second surface of the secondary backing is further co-laminated in such way that the first surface of the secondary backing is adhered to the back surface of the primary backing component by the adhesive composition, and the polymer film disposed on the second surface of the secondary backing and wherein a first portion of the polymer film is adhered to the primary backing component and a second portion of the polymer film is adhered to the second surface of the secondary backing.

The polymer film can be prepared by any techniques known in the art. In some aspects, the polymer film can be extruded. In yet other aspects, the polymer film can be blown. In yet further aspects, the polymer film can be cast. In still further aspects, the polymer film can be engineered to provide desirable characteristics.

One skilled in the art will appreciate that, notwithstanding the particular examples described above, it is contemplated that the carpet composition may be produced by the processes known to those skilled in the art, including but not limited to direct coating and roll metering, and knife-coating and lick-roll application, as described in D. C. Blackly, *Latex and Textiles*, section 19.4.2, page 361, which is incorporated herein by reference.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° F. or is at ambient temperature, and pressure is at or near atmospheric.

Example 1

Carpet compositions comprising a precoat composition comprising a polyolefin dispersion (POD), a SoftBac® secondary backing and a laminated plastic film was prepared and compared to a performance of a precoat composition comprising a styrene-butadiene resin (SBR) latex a Soft-Bac® secondary backing and a laminated plastic film. The filler load was measured on a basis of dry part per 100 dry parts of the polyolefin dispersion (POD) or SBR respectively. Tables 1 and 2 show dry and wet strength of the inventive and reference carpet respectively. Delamination Strength is measured according to the ASTM D3693 and is reported in pounds/inch (lb/in). Area Under Curve test is developed by Shaw Inc. as described above and is reported in pounds/inch (lb/in).

TABLE 1

Dry strength test results

| Precoat | Filler content (dry parts) | Add-on Weight (oz) | Velcro | Tuft bind lb/in | Delamination (lb/in) | Fail mode | Area Under Curve (lb/in) |
|---|---|---|---|---|---|---|---|
| POD | 300 | 10.5 | 9 | 2.701 | 5.243 | PS | 4.51344 |
| SBR |  | 10.5 | 9 | 3.981 | 5.118 | PS | 4.08277 |
| POD | 300 | 8 | 9 | 1.082 | 6.714 | PS | 5.65732 |
| SBR |  | 8 | 9 | 3.923 | 11.117 | PTS | 9.52037 |
| POD | 300 | 6 | 9 | 1.694 | 4.145 | PS | 3.4288 |
| SBR |  | 6 | 9 | 2.609 | 9.341 | PTS | 8.00138 |

TABLE 2

Wet strength test results

| Precoat | Filler content (dry parts) | Add-on Weight (oz) | Velcro | Tuft bind lb/in | Delamination (lb/in) | Fail mode | Area Under Curve (lb/in) |
|---|---|---|---|---|---|---|---|
| POD | 300 | 10.5 | 8 | 2.344 | 3.754 | PS | 2.88467 |
| SBR |  | 10.5 | 8 | 2.062 | 1.195 | PS | 0.93747 |
| POD | 300 | 8 | 8 | 2.29 | 4.467 | PS | 3.53966 |
| SBR |  | 8 | 8 | 2.03 | 2.391 | PTS | 1.76271 |
| POD | 300 | 6 | 8 | 2.285 | 2.61 | PS | 2.12649 |
| SBR |  | 6 | 8 | 2.276 | 2.451 | PTS | 1.91758 |

Example 2

A number of inventive carpet compositions and reference compositions were prepared having a POD or SBR precoat comprising a variable amount of filler load in the precoat composition, a variable type of a secondary backing (spunbond vs SoftBac®). Table 3 and 4 demonstrate how various static press lamination trials affect waterproof properties and wet strength properties of these carpet compositions. It is understood that the filler load is provided in dry parts per 100 parts of the POD or SBR composition; heat temperatures are provided in ° F.; film and gap thickness are provided in mils, pressure is provided in force lbs; wet delamination is provided in lbs/inch and is measured according to ASTM D3936; tuft binding is provided in lbs; and heating and cooling time are provided.

TABLE 3

Static Press Lamination Trials

| Sample ID | 1 | 2 | 3 | 4 | 5 | 6 | 7 |
|---|---|---|---|---|---|---|---|
| Filler Load | 300 | 250 | 250 | 250 | 415 | 415 | 250 |
| Precoat | POD | POD | POD | POD | SBR | SBR | POD |
| Film | 4 mil PE/PP | 4 mil PE/PP | 4 mil PE/PP | 4 mil PE/PP | 4 mil PE/PP | 4 mil PE/PP | 4 mil PE/PP |
| Second. backing | Spunbond | SoftBac ® | SoftBac ® | SoftBac ® | SoftBac ® | SoftBac ® | SoftBac ® |
| Top/Plastic heat | 335 | 335 | 290 | 290 | 290 | 290 | 290 |
| Bottom/Face | 335 | 305 | 270 | 270 | 270 | 270 | 270 |
| Heat Time | 3 | 3 | 3 | 3 | 2 | 3 | 2 |
| Cool Time | 4 | 6 | 0 | 6 | 3 | 6 | 3 |
| Gap | 0 | 200 mil | 200 mil | 200 mil | 200 mil | 200 mil | 200 mil |
| Pressure | 8100 force lbs | 8100 force lbs | 8100 force lbs | 8100 force lbs | 8100 force lbs | 8100 force lbs | 8100 force lbs |
| Waterproof | yes | yes | yes | yes | yes | yes | yes |

TABLE 4

Static Press Lamination Trials

| Sample ID | 1[a] | 2 | 3 | 4 | 5 | 6 | 7 |
|---|---|---|---|---|---|---|---|
| Filler Load | 300 | 250 | 250 | 250 | 415 | 415 | 250 |
| Precoat | POD | POD | POD | POD | SBR (omnova6770) | SBR (omnova6770) | POD |
| Film | 4 mil PE/PP | 4 mil PE/PP | 4 mil PE/PP | 4 mil PE/PP | 4 mil PE/PP | 4 mil PE/PP | 4 mil PE/PP |
| Second. backing | Spunbond (Freud 135 gsm) | SoftBac ® | SoftBac ® | SoftBac ® | SoftBac ® | SoftBac ® | SoftBac ® |
| Top/Plastic heat | 335 | 335 | 290 | 290 | 290 | 290 | 290 |
| Bottom/Face heat | 335 | 305 | 270 | 270 | 270 | 270 | 270 |
| Heat Time | 3 | 3 | 3 | 3 | 2 | 3 | 2 |
| Cool Time | 4 | 6 | 0 | 6 | 3 | 6 | 3 |
| Gap | 0 | 200 | 200 | 200 | 200 | 200 | 200 |
| Pressure | 8,100 | 8,100 | 8,100 | 8,100 | 8,100 | 8,100 | 8,100 |
| Waterproof | yes | yes | yes | yes | yes | yes | yes |
| Wet. Delam Wet Tuft Bind | | | 6.10* | Exceeded strength of Instron | 1.68 | 1.2 | Exceeded strength of Instron |

| Sample ID | 8 | 9 | 10 | 11 | 12 | 13 |
|---|---|---|---|---|---|---|
| Filler Load | 300 | 300 | 300 | 300 | 550 | 415 |
| Precoat | POD | POD | POD | POD | POD | SBR (omnova6770) |
| Film | 4 mil PE/PP | 4 mil PE/PP | 4 mil PE/PP | 4 mil PE/PP | 4 mil PE/PP | 4 mil PE/PP |
| Second. backing | SoftBac ® | SoftBac ® | SoftBac ® | SoftBac ® | SoftBac ® | SoftBac ® |
| Top/Plastic heat | 270 | 290 | 335 | 290 | 290 | 290 |
| Bottom/Face heat | 130 | 130 | 130 | 130 | 130 | 130 |
| Heat Time | 2 | 2 | 1 | 1 | 1 | 1 |
| Cool Time | 2 | 2 | 2 | 2 | 2 | 2 |
| Gap | 200 | 200 | 200 | 200 | 200 | 200 |
| Pressure | 8,100 | 8,100 | 8,100 | 8,100 | 8,100 | 8,100 |
| Waterproof | | | | yes | yes | yes |
| Wet. Delam Wet Tuft Bind | | | | 5.906** | 2.876** | |

*backing pulled out of clamp half way thought test, so actual value is higher.
**sample for wet delamination was soaked for 24 hours.
[a]too hot for the face fibers, melts to a flat mat.

Example 3

Additional lamination trails were performed on a number of samples having a POD or SBR precoat composition comprising a variable amount of a filler, and a variable thickness and a type of a polymer film. The results are summarized in Table 5. All samples but a carpet composition comprising 550 dry parts of filler per 100 parts of SBR and having 4 mil of PE/PP composite plastic film were prepared utilizing Black Bros. Co. lamination equipment. The carpet composition comprising 550 dry parts of filler per 100 parts of SBR and having 4 mil of PE/PP composite plastic film was prepared utilizing a lamination tool sold by Union Tool. Delamination is measured according to the ASTM D3936 and is measured in lbs/inch.

TABLE 5

Plastic lamination trials

| Filler load (dry parts) | Precoat | Film (mil) | Dry Delam. (lb/in) | Wet Delam. (lb/in) | 24 h Delam. (lb/in) | Tuft Bind (lbs) |
|---|---|---|---|---|---|---|
| 550 | POD[a] POD[b,d] | 3.5 (Lifeguard) | 2.8 | 1 | | |
| 150 | | 3.0 PP* | 15.6 | 9 | | |
| 550 | SBR | 3.0 PP* | 10.7 | 0.7 | | |
| 550 | SBR | 3.0 PP* | 11.4 | 0.6 | | |
| 550 | SBR | 3.0 PP* | 9.2 | 0.7 | | |
| 150 | POD[b,d] | 3.0 PP* | 11.4 | 10.4 | 11.8 | 2.3 |
| 550 | SBR | 3.0 PP* | 10.1 | 0.7 | 6.8 | 3.1 |
| 550 | POD[b,e] | 3.0 PP* | 1.9 | 0.8 | 2.1 | 3.4 |
| 150 | POD[b,d] | 3.0 PP* | 8.8 | 7.2 | 8.9 | 2.8 |
| 550 | SBR | 3.0 PP* | 10.1 | 0.7 | 9.2 | 5.6 |
| 550 | POD[a] | 3.5 (Lifeguard) | 2.6 | 0.7 | 2.6 | 3.3 |
| 550 | SBR | none | 7.2 | 0.55 | | |
| 550 | SBR[c] | 4.0 (PE/PP)** | 7.2 | 0.6 | | |

*PP- polypropylene film
**PE/PP- composite film comprising polyethylene and polypropylene
[a]Lamination temperature of 350° F.
[b]Lamination temperature of 390° F. and a gap of 0.049 inch
[c]Lamination temperature of 360° F., a pressure of 3,000 force lbs, a gap of 0.1 inch, and a speed of 7 ft/min
[d]Lamination speed of 27 ft/min
[e]Lamination speed of 30 ft/min Example 4

A number of inventive carpet compositions having a SBR precoat, a secondary backing (SoftBac®), and 5 mil of various types of a laminated film was prepared. Table 6 and 7 demonstrate how various static press lamination trials affect waterproof properties and wet strength properties of these carpet compositions. As indicated some of the samples were preheat prior to the laminating of the film. Any heater can be used to preheat the secondary backing. In some exemplary aspects, an IR heater has been used. It is understood that heat temperatures are provided in ° F.; film thickness is provided in mils and gap thickness is provided in inches, pressure is provided in force lbs; wet delamination is provided in lbs/inch and is measured according to the ASMT D3639; tuft binding is provided in lbs; line speed is provided in ft/min. Dry delamination has been measured twice and each measurement is marked as Delam 1 and Delam 2. The moisture permeability of the inventive carpet compositions has been determined according to the Bowl Penetration methods described in the United States Published Patent Application US20170205327A1 (U.S. application Ser. No. 15/408,109) that is incorporated by reference herein in its entirety.

In some exemplary aspects, the bowl-shaped test specimen is being placed flat on top of the metal mesh apparatus located on the floor of the plastic container. Next, 250 ml of the solution is poured through a funnel with a 10 mm (0.4 inches) spout onto the carpet specimen from a height of one meter (39 inches). In yet other aspects, the solution can be concentrated in the center of the bowl-shaped specimen. In some aspects, the solution can contain a staining agent.

Wetness and fluid penetration of the back of the sample is then assessed during the following exemplary time increments: 3 minutes; 1 hour; and 24 hours. Because the staining agent can sometimes be absorbed by the fiber (i.e., no coloration appears in the backing), the 3 minute and 1 hour assessment preferably should be done by the touch of the hand to assess the wetness of the backing. After 24 hours, the assessment is continued until the sample has reached a moisture equilibrium (dry to the touch). The assessment is recorded in increments of 24 hours. After 24 hours, the fluid penetration can also be assessed by observing the paper for the amount of stains on the paper and determining the number and size of pin dot stains on the paper.

The effect of the film color and transparency was also evaluated. The original clear film was colored to obtain a blue film. The percentage of blue described below relates to the percentage of the original blue film.

TABLE 6

Delamination and Water Penetration Trails.

| Sample ID | Line speed | Preheat Temp | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 1 | 15 | 160 | 360 | 100 | 30 | | 50% Blue | No PH | South | 4.14 | 4.88 | Fail |
| 1 | 15 | 160 | 360 | 100 | 30 | | 50% Blue | No PH | Middle | | | Fail (2d drip fail) |
| 1 | 15 | 160 | 360 | 100 | 30 | | 50% Blue | No PH | North | 5.33 | 4.6 | Fail (1st drip fail) |
| 1 | 15 | 160 | 360 | 100 | 30 | | 50% Blue | Varying PH | South | 5.13 | 3.75 | Fail |
| 1 | 15 | 160 | 360 | 100 | 30 | | 50% Blue | Varying PH | Middle | | | Fail |
| 1 | 15 | 160 | 360 | 100 | 30 | | 50% Blue | Varying PH | North | 4.59 | 4.01 | Fail (2d drip fail) |
| 1 | 15 | 160 | 360 | 100 | 30 | | 50% Blue | SS PH | South | 4.12 | 4.5 | Fail |
| 1 | 15 | 160 | 360 | 100 | 30 | | 50% Blue | SS PH | Middle | | | Fail (3rd drip fail) |
| 1 | 15 | 160 | 360 | 100 | 30 | | 50% Blue | SS PH | North | 4.26 | 4.76 | Pass |
| 1 | 20 | 160 | 360 | 100 | 30 | | 50% Blue | No PH | South | 3.246 | | Fail |

TABLE 6-continued

Delamination and Water Penetration Trails.

| Sample ID | Line speed | Preheat Temp | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 1 | 20 | 160 | 360 | 100 | 30 | | 50% Blue | No PH | Middle | | | Fail (1st drip fail) |
| 1 | 20 | 160 | 360 | 100 | 30 | | 50% Blue | No PH | North | 3.515 | | Fail (1st drip fail) |
| 1 | 20 | 160 | 360 | 100 | 30 | | 50% Blue | Varying PH | South | 2.889 | | Fail |
| 1 | 20 | 160 | 360 | 100 | 30 | | 50% Blue | Varying PH | Middle | | | Fail |
| 1 | 20 | 160 | 360 | 100 | 30 | | 50% Blue | Varying PH | North | 2.908 | | Pass |
| 1 | 20 | 160 | 360 | 100 | 30 | | 50% Blue | SS PH | South | 4.272 | | Fail (2d drip fail) |
| 1 | 20 | 160 | 360 | 100 | 30 | | 50% Blue | SS PH | Middle | | | Fail (2d drip fail) |
| 1 | 20 | 160 | 360 | 100 | 30 | | 50% Blue | SS PH | North | 5.164 | | Fail |
| 1 | 15 | 130 | 360 | 100 | 30 | | 50% Blue | No PH | South | 4.195 | | Fail |
| 1 | 15 | 130 | 360 | 100 | 30 | | 50% Blue | No PH | Middle | | | Fail (3rd drip fail) |
| 1 | 15 | 130 | 360 | 100 | 30 | | 50% Blue | No PH | North | 4.715 | | Pass |
| 1 | 15 | 130 | 360 | 100 | 30 | | 50% Blue | Varying PH | South | 5.143 | | Fail (1st drip fail) |
| 1 | 15 | 130 | 360 | 100 | 30 | | 50% Blue | Varying PH | Middle | | | Fail |
| 1 | 15 | 130 | 360 | 100 | 30 | | 50% Blue | Varying PH | North | 4.284 | | Fail (2d drip fail) |
| 1 | 15 | 130 | 360 | 100 | 30 | | 50% Blue | SS PH | South | 5.011 | | Fail |
| 1 | 15 | 130 | 360 | 100 | 30 | | 50% Blue | SS PH | Middle | | | Fail (1st drip fail) |
| 1 | 15 | 130 | 360 | 100 | 30 | | 50% Blue | SS PH | North | 5.536 | | Pass |
| 1 | 15 | 100 | 360 | 100 | 30 | 7 | 50% Blue | Varying PH | South | 4.586 | | Fail |
| 1 | 15 | 100 | 360 | 100 | 30 | 7 | 50% Blue | Varying PH | Middle | 4.701 | | Fail |
| 1 | 15 | 100 | 360 | 100 | 30 | 7 | 50% Blue | No PH | South | 4.165 | | Fail (4th drip fail) |
| 1 | 15 | 100 | 360 | 100 | 30 | 7 | 50% Blue | Varying PH | North | | | Fail (2d drip fail) |
| 1 | 15 | 100 | 360 | 100 | 30 | 7 | 50% Blue | No PH | North | | | Fail (1st drip fail) |
| 1 | 15 | 100 | 360 | 100 | 30 | 7 | 50% Blue | No PH | Middle | 4.363 | | Fail |
| 1 | 15 | 100 | 360 | 100 | 30 | 7 | 50% Blue | SS PH | North | | | Fail (1st drip fail) |
| 1 | 15 | 100 | 360 | 100 | 30 | 7 | 50% Blue | SS PH | Middle | 5.11 | | Fail (2d drip fail) |
| 1 | 15 | 100 | 360 | 100 | 30 | 7 | 50% Blue | SS PH | South | 3.851 | | Fail (1st drip fail) |
| 1 | 15 | 100 | 360 | 100 | 30 | 7 | 50% Blue | SS PH | South | | | Fail (Lam.preh/ 1st drip fail) |
| 1 | 15 | 100 | 360 | 100 | 30 | 7 | 50% Blue | SS PH | Middle | | | Fail (Lam.preh/ 2nd drip fail) |

TABLE 6-continued

Delamination and Water Penetration Trails.

| Sample ID | Line speed | Preheat Temp | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 1 | 15 | 100 | 360 | 100 | 30 | 7 | 50% Blue | SS PH | North | | | Fail (Lam.preh/2nd drip fail) |
| 1 | 15 | 100 | 360 | 100 | 30 | 7 | 50% Blue | No PH | South | | | Fail (1st drip fail) |
| 1 | 15 | 100 | 360 | 100 | 30 | 7 | 50% Blue | No PH | Middle | | | Fail (2nd drip fail) |
| 1 | 15 | 100 | 360 | 100 | 30 | 7 | 50% Blue | No PH | North | | | Fail (1st drip fail) |
| 1 | 15 | 100 | 360 | 100 | 30 | 7 | 50% Blue | Varying PH | South | | | Fail (1st drip fail) |
| 1 | 15 | 100 | 360 | 100 | 30 | 7 | 50% Blue | Varying PH | Middle | | | Fail (1st drip fail) |
| 1 | 15 | 100 | 360 | 100 | 30 | 7 | 50% Blue | Varying PH | North | | | Fail (1st drip fail) |
| 1 | 15 | 100 | 360 | 100 | 30 | 7 | 50% Blue | SS PH | South | | | Fail (1st drip fail) |
| 1 | 15 | 100 | 360 | 100 | 30 | 7 | 50% Blue | SS PH | Middle | | | Fail (1st drip fail) |
| 1 | 15 | 100 | 360 | 100 | 30 | 7 | 50% Blue | SS PH | North | | | Fail ($2^{nd}$ drip fail) |
| 1 | 15 | 100 | 360 | 100 | 30 | 7 | Clear | SS PH | South | | | Pass (clear film) |
| 1 | 15 | 100 | 360 | 100 | 30 | 7 | Clear | SS PH | Middle | | | Pass (clear film) |
| 1 | 15 | 100 | 360 | 100 | 30 | 7 | Clear | SS PH | North | | | Fail (clear film/1st drip fail) |
| 1 | 15 | 115/115 | 350 | 100 | 30 | 6 | 25% Blue | SS PH | North | 4.174 | | Pass |
| 1 | 15 | 115/115 | 350 | 100 | 30 | 6 | 25% Blue | SS PH | Middle | | | Pass |
| 1 | 15 | 115/115 | 350 | 100 | 30 | 6 | 25% Blue | SS PH | South | 3.772 | | Pass |
| 1 | 15 | 115/115 | 350 | 80 | 30 | 6 | 25% Blue | SS PH | North | 3.567 | | Fail (1st drip fail) |
| 1 | 15 | 115/115 | 350 | 80 | 30 | 6 | 25% Blue | SS PH | Middle | | | Pass |
| 1 | 15 | 115/115 | 350 | 80 | 30 | 6 | 25% Blue | SS PH | South | 4.149 | | Pass |
| 1 | 15 | 115/115 | 350 | 100 | 30 | 6 | Clear | SS PH | North | 1.688 | | Fail (1st drip fail) |
| 1 | 15 | 115/115 | 350 | 100 | 30 | 6 | Clear | SS PH | Middle | | | Pass |
| 1 | 15 | 115/115 | 350 | 100 | 30 | 6 | Clear | SS PH | South | 2.174 | | Fail (1st drip fail) |
| 1 | 15 | 115/115 | 360 | 100 | 30 | 6 | 25% Blue | SS PH | North | | | Fail (1st drip fail) |
| 1 | 15 | 115/115 | 360 | 100 | 30 | 6 | 25% Blue | SS PH | Middle | | | Fail |
| 1 | 15 | 115/115 | 360 | 100 | 30 | 6 | 25% Blue | SS PH | South | | | Fail |
| 1 | 15 | 115/115 | 360 | 100 | 30 | 6 | 25% Blue | SS PH | North | | | |
| 1 | 15 | 115/115 | 360 | 100 | 30 | 6 | 25% Blue | SS PH | Middle | | | |
| 1 | 15 | 115/115 | 360 | 100 | 30 | 6 | 25% Blue | SS PH | South | | | |

TABLE 6-continued

Delamination and Water Penetration Trails.

| Sample ID | Line speed | Preheat Temp | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 1 | 15 | 115/115 | 360 | 100 | 30 | 6 | 25% Blue | Wrinkle on carpet | Middle | | | |
| 1 | 15 | 115/115 | 360 | 100 | 30 | 6 | 25% Blue | Wrinkle on carpet | South | | | |
| 2 | 20 | 130 AT | 340 | 100 | 30 | 6 | 25% Blue | SS PH | South | | | Pass |
| 2 | 15 | 115 BT | 345 | 100 | 30 | 6 | 25% Blue | SS PH | South | | | Pass |
| 2 | 15 | 115 AT | 340 | 100 | 30 | 6 | 25% Blue | SS PH | South | | | Pass |
| 2 | 20 | 130 AT | 340 | 100 | 30 | 6 | 25% Blue | SS PH | Middle | | | Pass |
| 2 | 15 | 130 AT | 340 | 100 | 30 | 6 | 25% Blue | SS PH | Middle | | | Pass |
| 2 | 20 | 130 AT | 340 | 100 | 30 | 6 | 25% Blue | SS PH | North | | | Pass |
| 2 | 15 | 130 AT | 340 | 100 | 30 | 6 | 25% Blue | SS PH | South | | | Pass |
| 2 | 15 | 115 AT | 340 | 100 | 30 | 6 | 25% Blue | SS PH | North | | | Pass |
| 2 | 15 | 115 AT | 340 | 100 | 30 | 6 | 25% Blue | SS PH | Middle | | | Pass |
| 2 | 15 | 130 AT | 340 | 100 | 30 | 6 | 25% Blue | SS PH | North | | | Pass |
| 2 | 15 | 115/115 | 360 | 100 | 30 | 6 | 25% Blue | Wrinkle on carpet | South | | | Fail (1st drip fail) |
| 2 | 15 | 115/115 | 360 | 100 | 30 | 6 | 25% Blue | SS PH | North | | | Fail (1st drip fail) |
| 2 | 15 | 115/115 | 360 | 100 | 30 | 6 | 25% Blue | SS PH | Middle | | | Fail (1st drip fail) |
| 2 | 15 | 115/115 | 360 | 100 | 30 | 6 | 25% Blue | Wrinkle on carpet | Middle | | | Fail (1st drip fail) |
| 2 | 15 | 115/115 | 360 | 100 | 30 | 6 | 25% Blue | SS PH | North | | | Fail (1st drip fail) |
| 2 | 15 | 115/115 | 360 | 100 | 30 | 6 | 25% Blue | SS PH | | | | Fail (3rd drip fail) |
| 2 | 15 | 115/115 | 360 | 100 | 30 | 6 | 25% Blue | SS PH | Middle | | | Fail (1st drip fail) |
| 2 | 15 | 115/115 | 360 | 100 | 30 | 6 | 25% Blue | SS PH | South | | | Fail (1st drip fail) |
| 2 | 20 | 115/115 | 340 | 100 | 30 | 6 | 25% Blue | SS PH | North | 1.57 | | Pass |
| 2 | 20 | 115/115 | 340 | 100 | 30 | 6 | 25% Blue | SS PH | Middle | | | Pass |
| 2 | 20 | 115/115 | 340 | 100 | 30 | 6 | 25% Blue | SS PH | Middle | 2.406 | | Pass |
| 2 | 20 | 115/115 | 340 | 100 | 30 | 6 | 25% Blue | SS PH | South | | | Pass |
| 2 | 25 | 130 | 340 | 100 | 30 | 6 | 25% Blue | SS PH | North | 0.121 | | Pass |
| 2 | 25 | 130 | 340 | 100 | 30 | 6 | 25% Blue | SS PH | Middle | | | Pass |
| 2 | 25 | 130 | 340 | 100 | 30 | 6 | 25% Blue | SS PH | Middle | 1.101 | | Pass |
| 2 | 25 | 130 | 340 | 100 | 30 | 6 | 25% Blue | SS PH | South | | | Pass |
| 2 | 20 | 130 | 340 | 100 | 30 | 6 | 25% Blue | SS PH | North | 1.144 | | Pass |
| 2 | 20 | 130 | 340 | 100 | 30 | 6 | 25% Blue | SS PH | Middle | | | Pass |
| 2 | 20 | 130 | 340 | 100 | 30 | 6 | 25% Blue | SS PH | Middle | 1.839 | | Pass |
| 2 | 20 | 130 | 340 | 100 | 30 | 6 | 25% Blue | SS PH | South | | | Pass |

TABLE 6-continued

Delamination and Water Penetration Trails.

| Sample ID | Line speed | Preheat Temp | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 2 | 15 | 115 BT | 345 | 100 | 30 | 6 | 25% Blue | SS PH | North | | | Pass |
| 2 | 15 | 115 BT | 345 | 100 | 30 | 6 | 25% Blue | SS PH | Middle | | | Pass |

1- 25 oz poly loop PET
2- 25 oz dyed PET
PH- preheat laminating
SS PH- steady state preheat
Varying PH- surge in preheat temperature was observed
Middle, North, South- define a position where the specific test was measured, (original sample is 3').
Multiple measurements in the same position (i.e Middle, Middle) identify measurements taken in machine direction, or a counter direction).
Delam.1 and Delam.2 at least two dry delamination tests are conducted.

TABLE 7

Delamination and Water Penetration Trails

| Sample ID | Line speed | Preheat T | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 1 | 20 | 150 | 340 | 100 | 30 | 6 | 25% Blue | SS PH | North | 1.95 | | Pass |
| | | | | | | | | | North | 2.224 | | Pass |
| | | | | | | | | | Middle | | | Pass |
| | | | | | | | | | Middle | | | Pass |
| | | | | | | | | | South | 3.1 | | Pass |
| | | | | | | | | | South | 3.067 | | Pass |
| 3 | 20 | | 340 | 100 | 30 | 6 | 25% Blue | SS PH | 1 | 2.588 | 0.676 | Pass |
| 3 | 20 | | 340 | 100 | 30 | 6 | 25% Blue | SS PH | 2 | 2.603 | 1.222 | Pass |
| 3 | 20 | | 340 | 100 | 30 | 6 | 25% Blue | SS PH | 3 | 1.903 | 2.88 | Pass |
| 3 | 20 | | 340 | 100 | 30 | 6 | 25% Blue | SS PH | 4 | 1.567 | 2.18 | Pass |
| 3 | 20 | | 340 | 100 | 30 | 6 | 25% Blue | SS PH | 5 | 2.314 | 2.178 | Pass |
| 3 | 20 | | 340 | 100 | 30 | 6 | 25% Blue | SS PH | 6 | 1.709 | 3.627 | Pass |
| 3 | 20 | | 340 | 100 | 30 | 6 | 25% Blue | SS PH | 7 | 1.968 | 1.324 | Pass |
| 3 | 20 | | 340 | 100 | 30 | 6 | 25% Blue | SS PH | 8 | 1.85 | 2.685 | Pass |
| 3 | 20 | | 340 | 100 | 30 | 6 | 25% Blue | SS PH | 9 | 2.691 | 1.954 | Pass |
| 3 | 20 | | 340 | 100 | 30 | 6 | 25% Blue | SS PH | 10 | 1.532 | 1.215 | Pass |
| 3 | 20 | | 340 | 100 | 30 | 6 | 25% Blue | SS PH | 11 | 3.186 | 2.175 | Pass |
| 4 | 20 | 145 | 340 | 100 | 30 | 6 | 25% Blue | SS PH | South | 3.155 | | Pass |
| 5 | 20 | 145 | 340 | 100 | 30 | 6 | 25% Blue | SS PH | North | 4.177 | | Pass |
| 5 | 20 | 145 | 340 | 100 | 30 | 6 | 25% Blue | SS PH | Middle | 3.83 | | Pass |
| 5 | 20 | 145 | 340 | 100 | 30 | 6 | 25% Blue | SS PH | South | 4.634 | | Pass |
| 6 | 25 | 160 | 340 | 100 | 30 | 6 | 25% Blue | SS PH | North | 2.445 | | Pass |
| 6 | 25 | 160 | 340 | 100 | 30 | 6 | 25% Blue | SS PH | Middle | 2.902 | | Pass |
| 6 | 25 | 160 | 340 | 100 | 30 | 6 | 25% Blue | SS PH | South | 4.657 | | Pass |
| 7 | 25 | 160 | 340 | 100 | 30 | 6 | 25% Blue | SS PH | North | 0.213 | | Pass |
| 7 | 25 | 160 | 340 | 100 | 30 | 6 | 25% Blue | SS PH | Middle | 0.28 | | Pass |
| 7 | 25 | 160 | 340 | 100 | 30 | 6 | 25% Blue | SS PH | South | 0.411 | | Pass |

TABLE 7-continued

Delamination and Water Penetration Trails

| Sample ID | Line speed | Preheat T | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 7 | 22 | 160 | 340 | 100 | 30 | 6 | 25% Blue | SS PH | North | 0.378 | | Pass |
| 7 | 22 | 160 | 340 | 100 | 30 | 6 | 25% Blue | SS PH | Middle | 0.311 | | Pass |
| 7 | 22 | 160 | 340 | 100 | 30 | 6 | 25% Blue | SS PH | South | 0.63 | | Pass |
| 7 | 20 | 160 | 340 | 100 | 15 | 6 | 25% Blue | SS PH | North | 1.103 | | Pass |
| 7 | 20 | 160 | 340 | 100 | 15 | 6 | 25% Blue | SS PH | Middle | 2.137 | | Pass |
| 7 | 20 | 160 | 340 | 100 | 15 | 6 | 25% Blue | SS PH | South | 3.471 | | Pass |
| 7 | 15 | 160 | 340 | 100 | 15 | 6 | 25% Blue | SS PH | North | 1.432 | | Pass |
| 7 | 15 | 160 | 340 | 100 | 15 | 6 | 25% Blue | SS PH | Middle | 1.617 | | Pass |
| 7 | 15 | 160 | 340 | 100 | 15 | 6 | 25% Blue | SS PH | South | 1.994 | | Pass |
| 7 | 15 | 160 | 340 | 100 | 30 | 6 | 25% Blue | SS PH | North | 1.412 | | Pass |
| 7 | 15 | 160 | 340 | 100 | 30 | 6 | 25% Blue | SS PH | Middle | 1.881 | | Pass |
| 7 | 15 | 160 | 340 | 100 | 30 | 6 | 25% Blue | SS PH | South | 2.237 | | Pass |
| 7 | 20 | 160 | 340 | 100 | 30 | 6 | 25% Blue | SS PH | North | 1.096 | | Pass |
| 7 | 20 | 160 | 340 | 100 | 30 | 6 | 25% Blue | SS PH | Middle | 1.006 | | Pass |
| 7 | 20 | 160 | 340 | 100 | 30 | 6 | 25% Blue | SS PH | South | 1.077 | | Pass |
| 1 | 20 | 160 | 340 | 100 | 30 | 6 | 25% Blue | SS PH | North | 2.648 | 2.688 | Pass |
| 1 | 20 | 160 | 340 | 100 | 30 | 6 | 25% Blue | SS PH | Middle | 3.713 | 2.933 | Pass |
| 1 | 20 | 160 | 340 | 100 | 30 | 6 | 25% Blue | SS PH | South | 2.723 | 1.875 | Pass |
| Turned IR machine around | | | | | | | | | | | | |
| 1 | 20 | 160 | 340 | 100 | 30 | 6 | 25% Blue | SS PH | North | 2.476 | 3.007 | Pass |
| 1 | 20 | 160 | 340 | 100 | 30 | 6 | 25% Blue | SS PH | Middle | 1.724 | 1.468 | Pass |
| 1 | 20 | 160 | 340 | 100 | 30 | 6 | 25% Blue | SS PH | South | 0.964 | 1.91 | Pass |
| 1 | 20 | 220 | 340 | 100 | 30 | 6 | 25% Blue | SS PH | South | 0.524 | 0.443 | Pass (extra layer of backing) |
| 1 | 20 | 200 | 340 | 100 | 30 | 6 | 25% Blue | SS PH | North | 1.241 | | Pass (IR turned) |
| 1 | 20 | 200 | 340 | 100 | 30 | 6 | 25% Blue | SS PH | Middle | 1.166 | | Pass (IR turned) |
| 1 | 20 | 200 | 340 | 100 | 30 | 6 | 25% Blue | SS PH | South | 1.482 | | Pass (IR turned) |
| 1 | 20 | 220 | 340 | 100 | 30 | 6 | 25% Blue | SS PH | North | 2.187 | | Pass (IR turned) |
| 1 | 20 | 220 | 340 | 100 | 30 | 6 | 25% Blue | SS PH | Middle | 2.201 | | Pass (IR turned) |
| 1 | 20 | 220 | 340 | 100 | 30 | 6 | 25% Blue | SS PH | South | 2.581 | | Pass (IR turned) |
| 1 | 20 | 180 | 340 | 100 | 30 | 6 | 25% Blue | SS PH | North | 2.408 | | Pass (IR turned) |
| 1 | 20 | 180 | 340 | 100 | 30 | 6 | 25% Blue | SS PH | Middle | 2.943 | | Pass (IR turned) |

TABLE 7-continued

Delamination and Water Penetration Trails

| Sample ID | Line speed | Preheat T | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 1 | 20 | 180 | 340 | 100 | 30 | 6 | 25% Blue | SS PH | South | 2.772 | | Pass (IR turned) |
| 1 | 20 | 180 | 340 | 100 | 30 | 6 | 25% Blue | SS PH | North | 0.43 | | Pass (extra layer of backing) |
| 1 | 20 | 180 | 340 | 100 | 30 | 6 | 25% Blue | SS PH | Middle | 0.562 | | Pass (extra layer of backing) |
| 1 | 20 | 180 | 340 | 100 | 30 | 6 | 25% Blue | SS PH | South | 0.98 | | Pass (extra layer of backing) |
| Union Tool replaced the stop assembles on the laminator due to the stops moving the top roller was lowered ||||||||||||||
| 2 | 15 | 180 | 325 | 100 | 30 | 6 | 2% Blue | | | 4.796 | | Fail |
| 2 | 15 | 180 | 325 | 100 | 30 | 6 | 2% Blue | | | 5.106 | | Fail |
| 2 | 15 | 180 | 325 | 100 | 30 | 6 | 25% Blue | | | 4.202 | | Pass |
| 2 | 15 | 180 | 325 | 100 | 30 | 6 | 25% Blue | | | 3.604 | | Pass |
| 2 | 15 | 180 | 315 | 100 | 30 | 6 | 2% Blue | | | 3.748 | | Fail (very slow drip, better performance than at 325 F.) |
| 2 | 15 | 180 | 315 | 100 | 30 | 6 | 2% Blue | | | 3.501 | | Fail (very slow drip, better performance than at 325 F.) |
| 2 | 15 | 180 | 315 | 100 | 30 | 6 | 25% Blue | | | 2.078 | | Pass |
| 2 | 15 | 180 | 315 | 100 | 30 | 6 | 25% Blue | | | 3.125 | | Pass |
| 2 | 20 | 180 | 315 | 100 | 30 | 6 | 2% Blue | | | 1.964 | | Fail |
| 2 | 15 | 180 | 315 | 100 | 30 | 6 | 2% Blue | | | 6.225 | | |
| 2 | 18 | 180 | 315 | 100 | 30 | 6 | 2% Blue | | | 5.277 | | |
| 2 | 15 | 180 | 315 | 100 | 30 | 6 | 2% Blue | | | 5.498 | | Fail |
| 2 | 15 | 180 | 315 | 100 | 30 | 6 | 25% Blue | | | 4.001 | | Pass |
| 2 | 15 | 180 | 340 | 100 | 30 | 6 | 2% Blue | | | 5.498 | | Fail |
| 2 | 15 | 180 | 340 | 100 | 30 | 6 | 25% Blue | | | 4.001 | | Pass |
| New blue films without TiO$_2$ ||||||||||||||
| | 15 | 180 | 360 | 100 | 30 | 6 | LLDPE | | | | | Fail |
| | 15 | 180 | 360 | 100 | 30 | 6 | LDPE | | | | | Fail |
| 7 | 15 | 180 | 340 | 100 | 30 | 6 | LDPE | | | 2.606 | | Pass |
| 7 | 15 | 180 | 340 | 100 | 30 | 6 | LDPE | | | 3.516 | | Pass |
| 7 | 15 | 180 | 340 | 100 | 30 | 6 | LDPE | | | 4.435 | | Pass |
| 7 | 15 | 180 | 340 | 100 | 30 | 6 | LDPE | | | 4.858 | | Pass |
| 2 | 15 | 180 | 340 | 100 | 30 | 6 | LDPE | | | | | Pass |
| 2 | 15 | 180 | 340 | 100 | 30 | 6 | LDPE | | | | | Pass |
| 2 | 15 | 180 | 340 | 100 | 30 | 6 | LDPE | | | | | Pass |
| 2 | 15 | 180 | 340 | 100 | 30 | 6 | LDPE | | | | | Pass |
| 8 | 15 | 180 | 340 | 100 | 30 | 6 | LDPE | | | 6.907 | | Pass |
| 8 | 15 | 180 | 340 | 100 | 30 | 6 | LDPE | | | 6.082 | | Pass |

TABLE 7-continued

Delamination and Water Penetration Trails

| Sample ID | Line speed | Preheat T | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 8 | 15 | 180 | 340 | 100 | 30 | 6 | LDPE | | | 7.575 | | Pass |
| 8 | 15 | 180 | 340 | 100 | 15 | 6 | LDPE | | | 8.578 | | Pass |
| 8 | 15 | 180 | 340 | 100 | 30 | | LLDPE | | | 6.013 | | |
| 8 | 15 | 180 | 340 | 100 | 30 | | LLDPE | | | 6.253 | | |
| 8 | 15 | 180 | 340 | 100 | 30 | | LLDPE | | | 6.038 | | |
| 8 | 15 | 180 | 340 | 100 | 30 | | LLDPE | | | 6.331 | | |
| 2 | 15 | 180 | 340 | 100 | 30 | | LLDPE | | | 5.076 | | |
| 2 | 15 | 180 | 340 | 100 | 30 | | LDPE | | | 3.837 | | |
| 2 | 15 | 180 | 340 | 100 | 30 | | LLDPE | | | 4.713 | | |
| 2 | 15 | 180 | 340 | 100 | 30 | | LLDPE | | | 4.807 | | |
| 2 | 15 | 180 | 340 | 100 | 30 | | LLDPE | | | 4.5 | | |
| 2 | 15 | 180 | 340 | 100 | 30 | | LDPE | | | 4.8 | | |
| 2 | 15 | 180 | 340 | 100 | 30 | | LDPE | | | 5.415 | | |
| 2 | 15 | 180 | 340 | 100 | 30 | | LDPE | | | 5.441 | | |
| 7 | 15 | 180 | 340 | 100 | 18 | 18 | LLDPE | | | 3.753 | | |
| 7 | 15 | 180 | 340 | 100 | 18 | 18 | LLDPE | | | 3.918 | | |
| 7 | 15 | 180 | 340 | 100 | 18 | | LLDPE | | | 3.412 | | |
| 7 | 15 | 180 | 340 | 100 | 18 | | LLDPE | | | 3.185 | | |
| 7 | 15 | 180 | 340 | 100 | 15 | 6 | LDPE | | | 3.899 | | Pass |
| 7 | 15 | 180 | 340 | 100 | 15 | 6 | LDPE | | | 4.315 | | Pass |
| 7 | 15 | 180 | 340 | 100 | 15 | 6 | LDPE | | | 2.557 | | Pass |
| 7 | 15 | 180 | 340 | 100 | 15 | 6 | LDPE | | | 4.091 | | Pass |
| 7 | 18 | 180 | 340 | 100 | 15 | 6 | LDPE | | | 0.795 | | Pass |
| 7 | 18 | 180 | 340 | 100 | 15 | 6 | LDPE | | | 1.386 | | Pass |
| 7 | 18 | 180 | 340 | 100 | 15 | 6 | LDPE | | | 0.697 | | Pass |
| 7 | 18 | 180 | 340 | 100 | 15 | 6 | LDPE | | | 0.938 | | Pass |
| 7 | 20 | 180 | 340 | 100 | 15 | 6 | LDPE | | | 0.637 | | Pass |
| 7 | 20 | 180 | 340 | 100 | 15 | 6 | LDPE | | | 0.448 | | Pass |
| 7 | 20 | 180 | 340 | 100 | 15 | 6 | LDPE | | | 0.11 | | Pass |
| 7 | 20 | 180 | 340 | 100 | 15 | 6 | LDPE | | | 0.954 | | Pass |
| 2 | 15 | 180 | 340 | 100 | 30 | 6 | LDPE | | | 5.152 | | Pass |
| 2 | 15 | 180 | 340 | 100 | 30 | 6 | LDPE | | | 4.707 | | Pass |
| 2 | 15 | 180 | 340 | 100 | 30 | 6 | LDPE | | | 4.999 | | Pass |
| 2 | 15 | 180 | 340 | 100 | 30 | 6 | LDPE | | | 4.746 | | Pass |
| 2 | 18 | 180 | 340 | 100 | 30 | 6 | LDPE | | | 3.61 | | Pass |
| 2 | 18 | 180 | 340 | 100 | 30 | 6 | LDPE | | | 2.039 | | Pass |
| 2 | 18 | 180 | 340 | 100 | 30 | 6 | LDPE | | | 3.138 | | Pass |
| 2 | 18 | 180 | 340 | 100 | 30 | 6 | LDPE | | | 4.31 | | Pass |
| 2 | 20 | 180 | 340 | 100 | 30 | 6 | LDPE | | | 2.941 | | Pass |
| 2 | 20 | 180 | 340 | 100 | 30 | 6 | LDPE | | | 2.395 | | Pass |
| 2 | 20 | 180 | 340 | 100 | 30 | 6 | LDPE | | | 3.757 | | Pass |
| 2 | 20 | 180 | 340 | 100 | 30 | 6 | LDPE | | | 2.627 | | Pass |
| 9 | 20 | 200 | 340 | 100 | 30 | 6 | LDPE | | | 1.725 | | Pass (loose on edges, oil at T, but roller was 315 F. at edges and 325 in the center) |
| 9 | 20 | 200 | 340 | 100 | 30 | 6 | LDPE | | | 1.787 | | Pass |
| 9 | 20 | 200 | 340 | 100 | 30 | 6 | LDPE | | | 1.957 | | Pass |
| 9 | 18 | 200 | 340 | 100 | 30 | 6 | LDPE | | | 4.193 | | Pass |
| 9 | 18 | 200 | 340 | 100 | 30 | 6 | LDPE | | | 4.488 | | Pass |
| 9 | 18 | 200 | 340 | 100 | 30 | 6 | LDPE | | | 3.404 | | Pass |
| 10 | 20 | 200 | 350 | 100 | 30 | 6 | LDPE | | | 5.78 | | |
| 10 | 20 | 200 | 350 | 100 | 30 | 6 | LDPE | | | 6.067 | | |
| 10 | 20 | 200 | 350 | 100 | 30 | 6 | LDPE | | | 3.884 | | |
| 10 | 20 | 200 | 360 | 100 | 30 | 6 | LDPE | | | 3.711 | | Fail |
| 10 | 20 | 200 | 360 | 100 | 30 | 6 | LDPE | | | 5.061 | | Fail |
| 10 | 20 | 200 | 360 | 100 | 30 | 6 | LDPE | | | 4.965 | | Pass |
| 1 | 15 | 180 | 350 | 100 | 30 | 6 | LDPE (150") | | | 5.531 | | Pass (Center) |
| 1 | 15 | 180 | 350 | 100 | 30 | 6 | LDPE (150") | | | 5.406 | | Pass (South) |
| 1 | 15 | 180 | 350 | 100 | 30 | 6 | LDPE (150") | | | 6.137 | | Pass (North) |
| 1 | 15 | 180 | 350 | 100 | 30 | 6 | LDPE (150") | | | 4.886 | | Pass (Center) |
| 1 | 15 | 180 | 350 | 100 | 30 | 6 | LDPE (150") | | | 5.483 | | Fail (South) |

TABLE 7-continued

Delamination and Water Penetration Trails

| Sample ID | Line speed | Preheat T | Lamination Temp | Lamination Pressure | Lamination Gap | Plastic Feed Pressure | Film | Other Test Variables | Sample Position | Delam.1 | Delam.2 | Bowl-250 mL |
|---|---|---|---|---|---|---|---|---|---|---|---|---|
| 1 | 15 | 180 | 350 | 100 | 30 | 6 | LDPE (150″) | | | | 5.94 | Pass (North) |

3- 25 oz dyed PET through Reshear Roll Up
4- 90 oz dyed Nylon (WG style)
5- 70 oz dyed Nylon (style MA558)
6- WG style delam 90 oz dyed Nylon
7- 18 oz SD (solution dyed) PET
8- 65 oz SD (solution dyed) PET
9- High Performance PET construction change –65 oz solution dyed (SD) PET
10- 50 oz solution dyed (SD) PET Style Just A Hint II While certain exemplary aspects of the invention have been described and disclosed, it will be apparent to those skilled in the art that various changes and modifications may be made that will achieve some or even all of the advantages of the invention without departing from the spirit and scope of the invention.

The invention claimed is:

1. A carpet comprising:
   a. a greige good comprising:
      i) a primary backing having a face and a back surface;
      ii) a plurality of fibers attached to the primary backing and extending from the face of the primary backing and exposed at the back surface of the primary backing;
   b. a precoat composition applied to the back surface of the primary backing material; and
   c. a secondary backing system adjacent to the precoat composition, wherein the secondary backing system comprises:
      i) a secondary backing layer having a first surface and an opposing second surface; and
      ii) a composite film comprising: A) at least three layers comprising polyethylene, and B) a polypropylene core layer, wherein each outer layer of the composite film is one of the at least three layers comprising polyethylene, wherein the composite film is directly laminated to the second surface of the secondary backing layer, wherein the secondary backing layer is preheated prior to the composite film being laminated to the second surface of the secondary backing layer,
   wherein the composite film is continuous and free of perforations, and wherein the composite film is water impermeable.

2. The carpet of claim 1, wherein the carpet is a broadloom carpet.

3. The carpet of claim 1, wherein the secondary backing layer comprises a woven fabric, wherein polypropylene fibers or polyethylene terephthalate fibers, or a combination thereof are needle punched into the woven fabric to be extending from the first surface, wherein the polypropylene fibers or polyethylene terephthalate fibers, or a combination thereof are embedded within the precoat composition.

4. The carpet of claim 1, wherein the secondary backing layer comprises a fiberglass scrim.

5. The carpet of claim 1, wherein the composite film has a thickness of less than about 6 mils.

6. The carpet of claim 1, wherein the composite film is impermeable to gases.

7. The carpet of claim 1, wherein the precoat composition comprises a thermoplastic dispersion or latex.

8. The carpet of claim 7, wherein the precoat comprises the latex, wherein the latex comprises a carboxylated styrene-butadiene (XSB) latex copolymer, a styrene-butadiene resin (SBR) latex, a butadiene methyl methacrylate (BDMMA) latex, an acrylic latex, an acrylic copolymer, a styrene copolymer, or a combination thereof.

9. The carpet of claim 7, wherein the precoat composition further comprises a filler.

10. The carpet of claim 7, wherein the precoat comprises latex and wherein the carpet exhibits a wet delamination strength at an interface between the secondary backing layer first surface and the latex precoat composition, as measured according to ASTM D3936, that is greater than a wet delamination strength of a substantially identical reference carpet as measured according to ASTM D3936 at an interface between a reference secondary backing layer first surface and a reference precoat composition,
   wherein the substantially identical reference carpet is substantially identical to the carpet but for the presence of the composite film applied to the second surface of the secondary backing material.

11. The carpet of claim 1, wherein the carpet exhibits a wet delamination strength at an interface between the secondary backing layer first surface and the precoat composition that is at least 2 pounds/inch as measured according to ASTM D3936.

12. The carpet of claim 1, wherein the carpet exhibits a wet delamination strength at an interface between the secondary backing layer first surface and the precoat composition that is at least 5 pounds/inch as measured according to ASTM D3936.

13. The carpet of claim 1, wherein the composite film consists of: A) three layers comprising polyethylene, and B) a polypropylene core layer, wherein each outer layer of the composite film is one of the three layers comprising polyethylene.

14. A method of making a carpet comprising:
   (a) providing a greige good comprising:
      i) a primary backing component having a face surface and a back surface; and
      ii) a plurality of fibers attached to the primary backing component and extending from the face surface of the primary backing component;
   (b) applying a precoat composition to the back surface of the primary backing component to provide a precoated greige good;

(c) applying a first surface of a secondary backing layer to the precoated back surface of the primary backing component; and (d) directly laminating composite film comprising: A) at least three layers comprising polyethylene, and B) a polypropylene core layer, wherein each outer layer of the composite film is one of the at least three layers comprising polyethylene, wherein the laminated composite film is continuous and free of perforations, wherein the laminated composite film is water impermeable, wherein prior to step d) the secondary backing of the carpet is heated.

15. The method of claim 14, wherein the carpet is a broadloom carpet.

16. The method of claim 14, wherein the secondary backing layer comprises a woven fabric, wherein polypropylene fibers or polyethylene terephthalate fibers, or a combination thereof are needle punched into the woven fabric to be extending from the first surface, wherein the polypropylene fibers or polyethylene terephthalate fibers, or a combination thereof are embedded within the precoat composition.

17. The method of claim 14, wherein the laminated composite film has a thickness of less than about 6 mils.

18. The method of claim 14, wherein the laminated composite film is impermeable to gases.

19. The method of claim 14, wherein the precoat composition comprises a thermoplastic dispersion or latex.

20. The method of claim 19, wherein the precoat comprises the latex, wherein the latex comprises a carboxylated styrene-butadiene (XSB) latex copolymer, a styrene-butadiene resin (SBR) latex, a butadiene methyl methacrylate (BDMMA) latex, an acrylic latex, an acrylic copolymer, a styrene copolymer, or a combination thereof.

* * * * *